US012736908B2

(12) United States Patent
Tsuruga et al.

(10) Patent No.: US 12,736,908 B2
(45) Date of Patent: Sep. 15, 2026

(54) CHARGE-ELIMINATING APPARATUS, IMAGE FORMING SYSTEM AND CHARGE ADJUSTING APPARATUS

(71) Applicant: CANON KABUSHIKI KAISHA, Tokyo (JP)

(72) Inventors: Ryosuke Tsuruga, Chiba (JP); Yutaka Kakehi, Chiba (JP); Yasuharu Chiyoda, Chiba (JP); Yasushi Takeuchi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/956,155

(22) Filed: Nov. 22, 2024

(65) Prior Publication Data

US 2025/0199449 A1 Jun. 19, 2025

(30) Foreign Application Priority Data

Dec. 15, 2023 (JP) ................................ 2023-212351

(51) Int. Cl.
*G03G 15/00* (2006.01)
*B65H 5/06* (2006.01)

(52) U.S. Cl.
CPC ......... *G03G 15/6573* (2013.01); *B65H 5/062* (2013.01); *G03G 15/5016* (2013.01); (Continued)

(58) Field of Classification Search
CPC ........... G03G 15/6573; G03G 15/5016; G03G 15/5062; G03G 2215/00632; G03G 2215/00767; B65H 5/062; B65H 2301/44318; B65H 2301/5133; B65H 2553/20; B65H 2801/27
See application file for complete search history.

(56) References Cited

U.S. PATENT DOCUMENTS

2009/0060618 A1* 3/2009 Fujikura ................ G03G 15/60 399/407
2010/0023285 A1* 1/2010 Nakanishi .......... G01R 31/3835 702/179

(Continued)

FOREIGN PATENT DOCUMENTS

JP 2000-214690 A 8/2000
JP 2014-119706 A 6/2014

(Continued)

OTHER PUBLICATIONS

Aug. 20, 2025 Extended Search Report in European Patent Application Pub. No. 24 214 115.8.
Co-Pending U.S. Appl. No. 19/042,145, filed Jan. 31, 2025.

*Primary Examiner* — David H Banh
(74) *Attorney, Agent, or Firm* — Venable LLP

(57) ABSTRACT

A charge-eliminating apparatus includes a charge-eliminating member for eliminating charge of a sheet while nipping and conveying the sheet, a voltage applying unit for applying a voltage to the charge-eliminating member, and a detecting unit for detecting a voltage applied to the charge-eliminating member or a current flowing through the charge-eliminating member. A controller measures an electrification charge amount of the sheet based on a detecting result of the detecting unit while the sheet passes through the charge-eliminating member.

29 Claims, 9 Drawing Sheets

(52) U.S. Cl.
CPC .................... *G03G 15/5062* (2013.01); *B65H 2301/44318* (2013.01); *B65H 2301/5133* (2013.01); *B65H 2553/20* (2013.01); *B65H 2801/27* (2013.01); *G03G 2215/00632* (2013.01); *G03G 2215/00767* (2013.01)

(56) References Cited

U.S. PATENT DOCUMENTS

| | | | | |
|---|---|---|---|---|
| 2018/0046122 | A1* | 2/2018 | Kitajima | G03G 15/0233 |
| 2018/0267424 | A1* | 9/2018 | Mandai | G03G 15/0216 |
| 2019/0356115 | A1* | 11/2019 | Yamakawa | B65H 20/02 |
| 2021/0216027 | A1* | 7/2021 | Tanaka | G03G 15/6573 |
| 2021/0216031 | A1 | 7/2021 | Tanaka et al. | |
| 2022/0236674 | A1* | 7/2022 | Kikuchi | G03G 15/5029 |
| 2022/0410591 | A1* | 12/2022 | Ishida | G03G 15/6529 |
| 2024/0160141 | A1* | 5/2024 | Yoshikawa | G03G 15/6511 |

FOREIGN PATENT DOCUMENTS

| | | | |
|---|---|---|---|
| JP | 2019-156603 | A | 9/2019 |
| JP | 2019-167169 | A | 10/2019 |
| JP | 2023-098240 | A | 7/2023 |

* cited by examiner (a)

(b)

CHARGE-ELIMINATING APPARATUS, IMAGE FORMING SYSTEM AND CHARGE ADJUSTING APPARATUS

FIELD OF THE INVENTION AND RELATED ART

The present disclosure relates to a charge-eliminating apparatus which eliminates electric charge of a sheet, an image forming system which forms an image on the sheet, and a charge adjusting apparatus which adjusts electric charge distribution on the sheet.

In Japanese Patent Application Laid-Open No. 2019-167169, a charge-eliminating apparatus, which eliminates charge of a sheet using a charge-eliminating roll, which contacts the sheet (charge-eliminator of contact type) and a charge-eliminator of non-contact type of corotron type, is disclosed. In Japanese Patent Application Laid-Open No. 2019-156603, a charging process apparatus which performs charging process (charge-eliminating) of a sheet and is provided with a surface potential sensor which detects surface potential of the sheet and adjusts voltage to be applied to a charging roll based on a measured value of the surface potential sensor.

In the conventional configurations, a number of components gets increased due to the surface potential sensor being disposed additionally for a purpose of detecting the surface potential of the sheet. Therefore, it has been desired to enable to detect an electrification charge amount or surface potential of a sheet or to enable control corresponding to the electrification charge amount or the surface potential of the sheet with a simpler configuration.

SUMMARY OF THE INVENTION

Therefore, an object of the present disclosure is to provide a charge-eliminating apparatus, an image forming system and a charge adjusting apparatus which can detect an electrification charge amount of a sheet or control according to the electrification charge amount with a simpler configuration. According to an aspect of the present invention, there is provided a charge-eliminating apparatus comprising: a charge-eliminating member configured to eliminate charge of a sheet while nipping and conveying the sheet; a voltage applying unit configured to apply a voltage to the charge-eliminating member; a detecting unit configured to detect a voltage applied to the charge-eliminating member or a current flowing through the charge-eliminating member; and a controller configured to measure an electrification charge amount of the sheet based on a detecting result of the detecting unit while the sheet passes through the charge-eliminating member.

Further features of the present invention will become apparent from the following description of exemplary embodiments with reference to the attached drawings.

Figure 6:
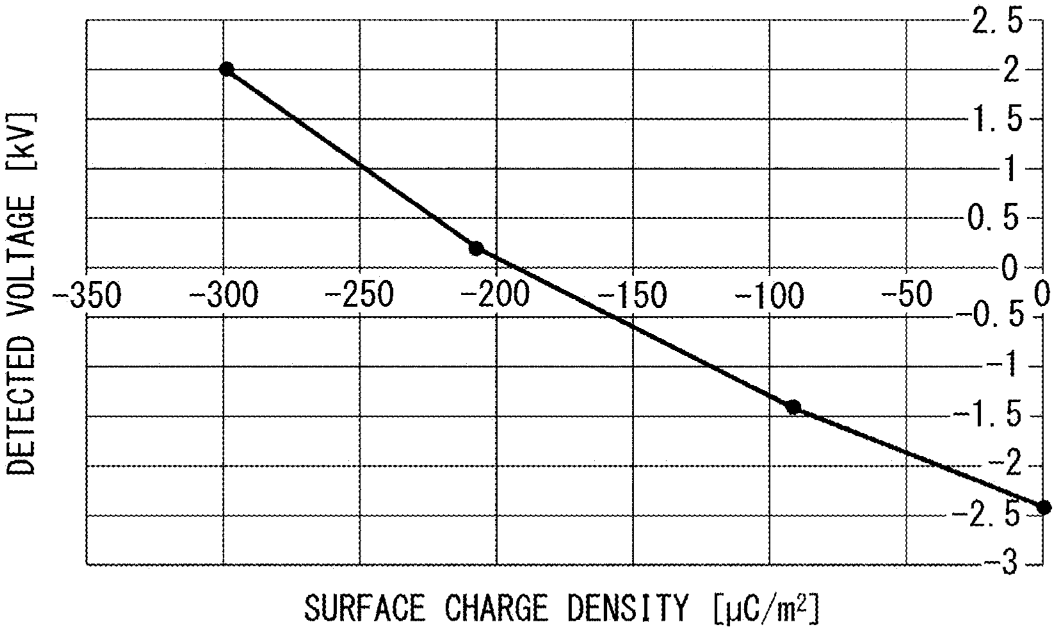
Figure 6:
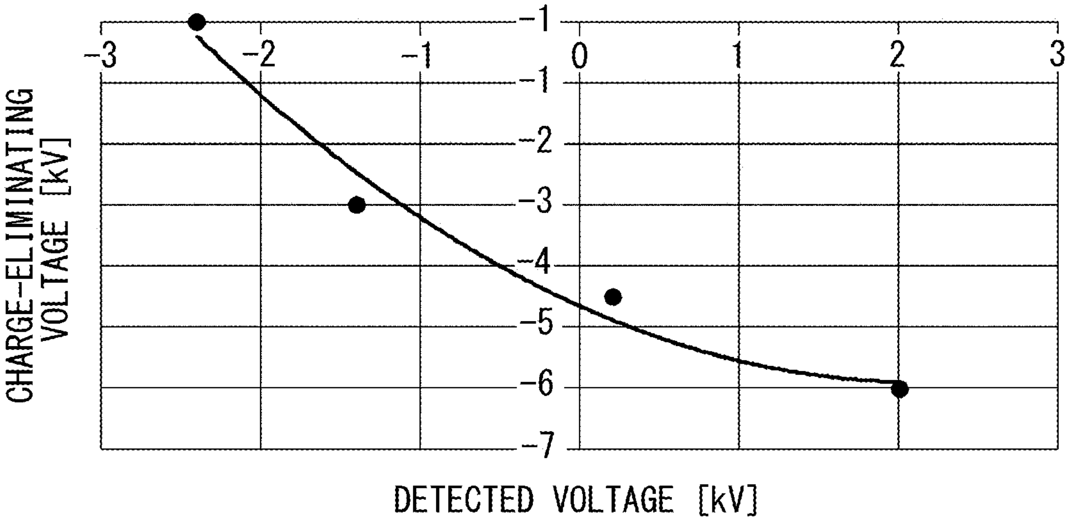

Part (a) of FIG. 6 is a graph illustrating relationship between an electrification charge amount of a sheet and detected voltage, and part (b) of FIG. 6 is a graph illustrating relationship between the detected voltage and charge-eliminating voltage according to the Embodiment 1.

Figure 7:
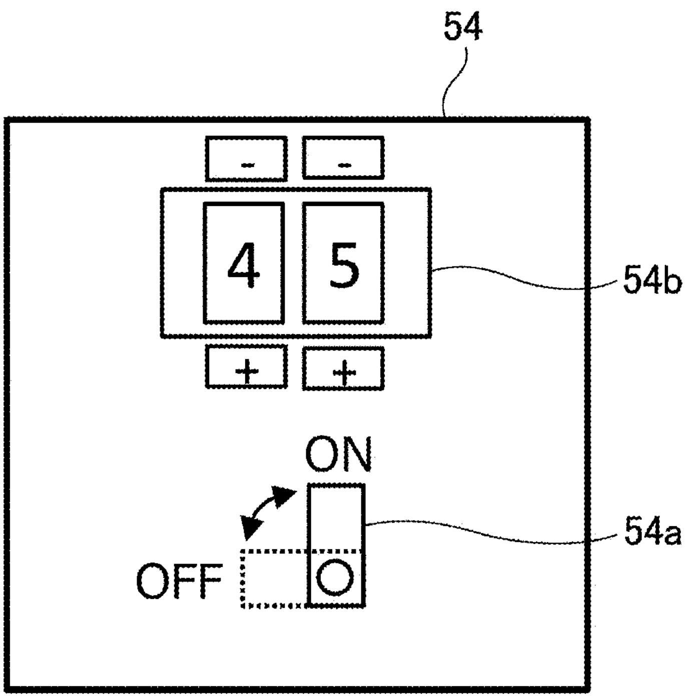

FIG. 7 is a view illustrating an operating portion for charge-eliminating according to an Embodiment 2.

Figure 8:
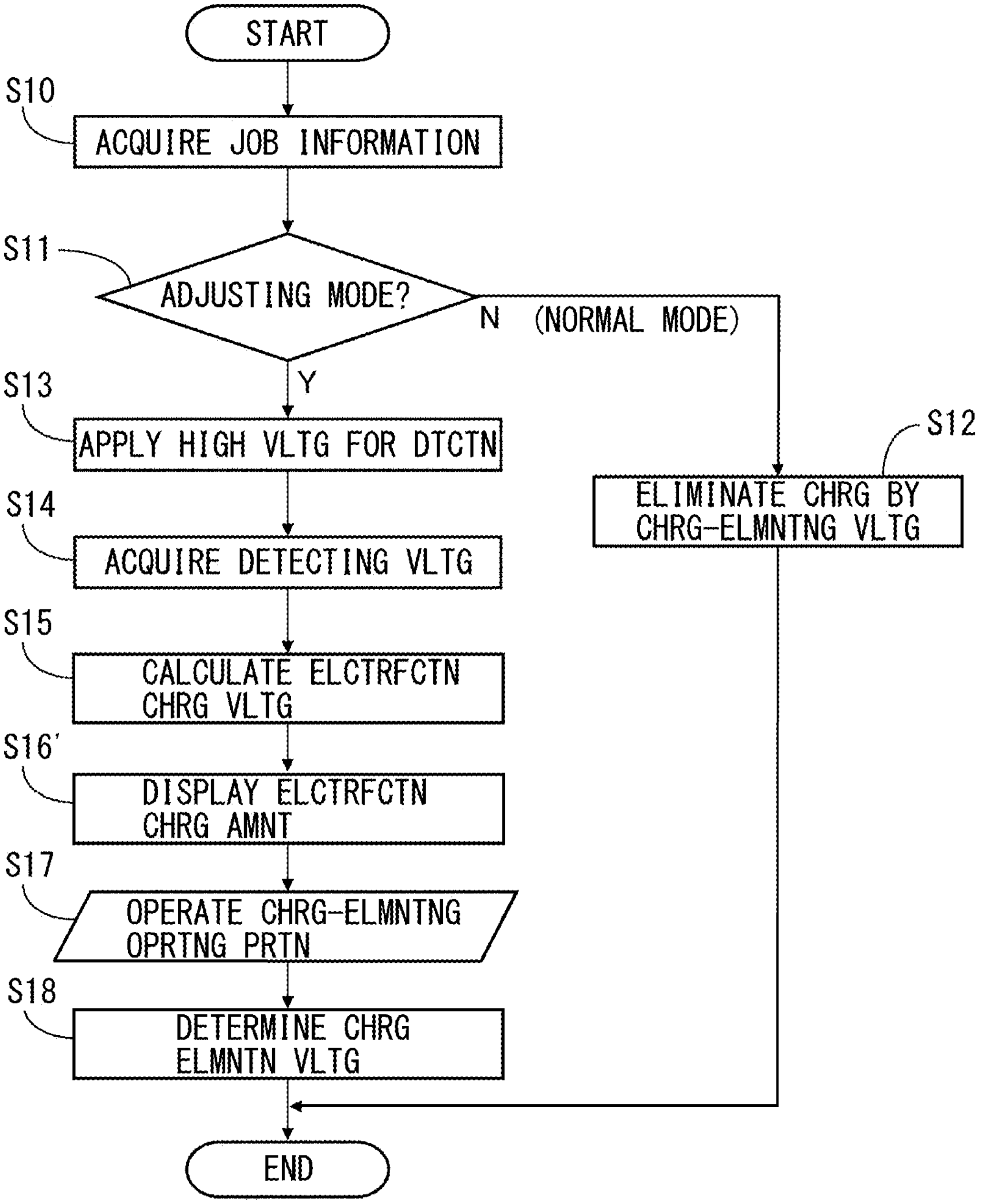

FIG. 8 is a flowchart illustrating a control method according to the Embodiment 2.

Figure 9:
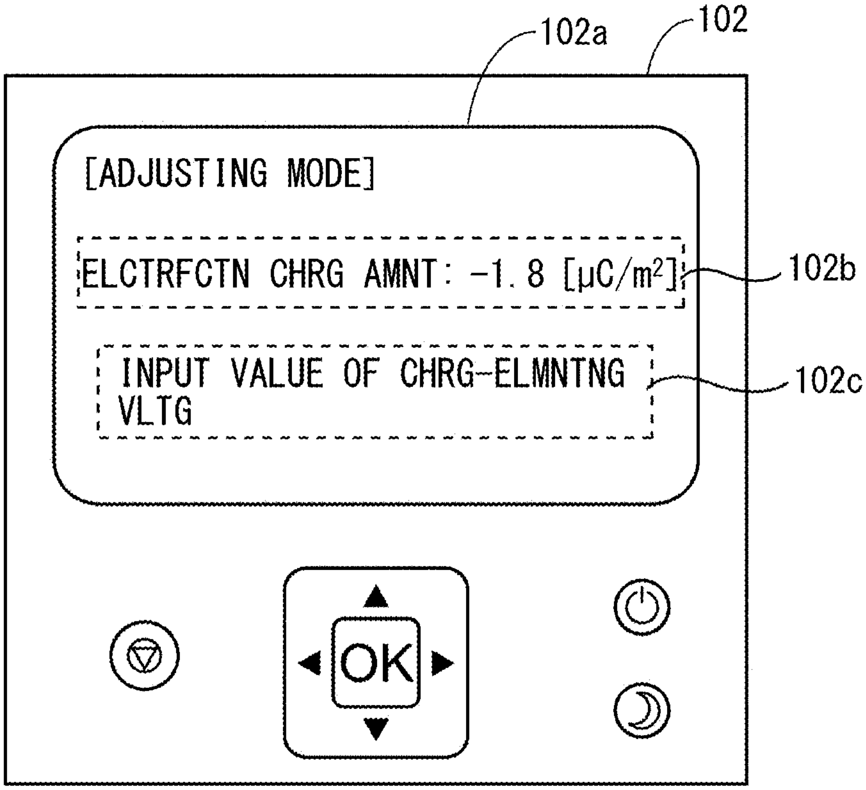

FIG. 9 is a view illustrating an example of a screen display according to the Embodiment 2.

DESCRIPTION OF THE EMBODIMENTS

Hereinafter, Embodiments according to the present disclosure will be described with reference to the drawings.

Embodiment 1

Figure 1:
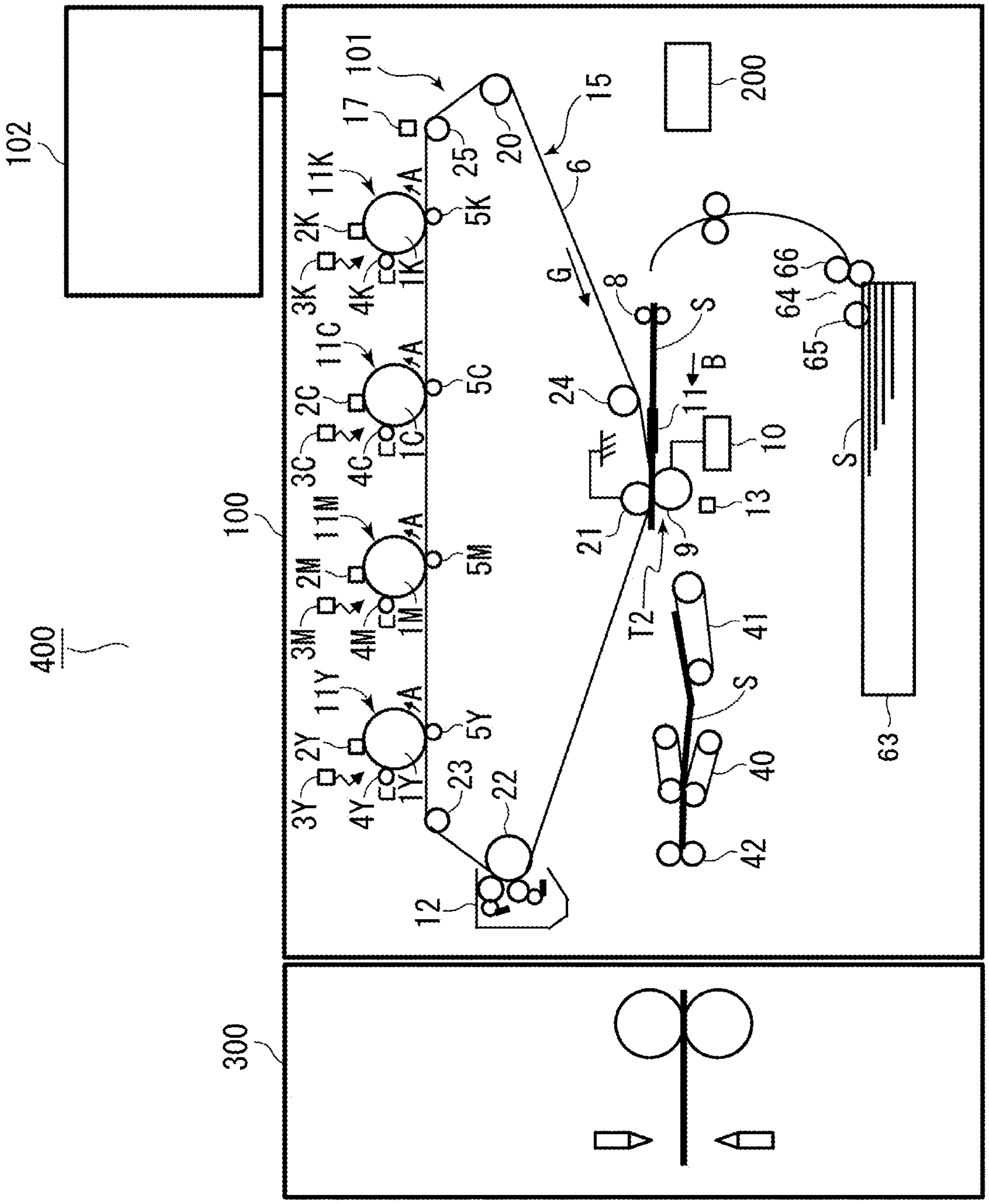
FIG. 1 is a schematic view of an image forming system according to an Embodiment 1.

FIG. 1 illustrates a schematic view of an image forming system 400 according to an Embodiment 1. The image forming system 400 includes an image forming apparatus 100 (printer) and a charge-eliminating apparatus 300, which is connected to the image forming apparatus 100. The image forming system 400 forms an image on a sheet S and discharges the sheet S as a product (printed product). As the sheet S which is a recording material (recording medium), a variety of sheet material of different sizes and material may be used, for example, a paper such as a plain paper and a thick paper, sheet material onto which surface treatment is applied such as a coated paper, special shaped sheet material such as an envelope and an index paper, sheet material made of plastic, a cloth, etc. Examples of the sheet material made of plastic include a synthetic paper whose main raw material is synthetic resin and a sheet for an overhead projector (OHT).

The charge-eliminating apparatus 300 is an apparatus (static eliminator) which has a charge-eliminating function which eliminates (reduces) electric charge (charge) of the sheet S discharged from the image forming system 400. The charge-eliminating apparatus 300 may be referred to as a charge adjusting apparatus for adjusting a charged state of the sheet S discharged from the image forming system 400. The charge-eliminating apparatus 300 may have functions other than the charge-eliminating function (e.g., a decurler function to correct curling of the sheet S). In addition, the charge-eliminating apparatus 300 in the present Embodiment is disposed as an apparatus independent of the image forming apparatus 100, however, the charge-eliminating apparatus 300 may be incorporated in a housing of the image forming apparatus 100.

The image forming system 400 may include an optional apparatus other than the charge-eliminating apparatus 300. Examples of the optional apparatus include a high-capacity feeding apparatus (optional feeder), which supplies the sheet S to the image forming apparatus 100, and a sheet processing apparatus (finisher), which applies a process such as a binding process to the sheets S on which the images are formed by the image forming apparatus 100.

Image Forming Apparatus

An outline configuration of the image forming apparatus 100 is illustrated in FIG. 1. The image forming apparatus 100 includes an image forming portion 101, which is an electrophotographic mechanism of intermediary transfer type. The image forming portion 101 includes four process units 11Y, 11M, 11C and 11K, which include photosensitive drums 1Y, 1M, 1C and 1K, respectively, and a transfer unit 15, which includes an intermediary transfer belt 6 and a secondary transfer roller 9.

Each process unit includes the photosensitive drum as an image bearing member (latent image bearing member), a charging device, an exposure device and a developing device as a process portion which acts on the photosensitive drum to perform each process of electrophotographic processes. That is, the process unit 11Y includes the photosensitive drum 1Y, a charging device 2Y, an exposure device 3Y and a developing device 4Y. The process unit 11M includes the photosensitive drum 1M, a charging device 2M, an exposure device 3M and a developing device 4M. The process unit 11C includes the photosensitive drum 1C, a charging device 2C, an exposure device 3C and a developing device 4C. The process unit 11K includes the photosensitive drum 1K, a charging device 2K, an exposure device 3K and a developing device 4K.

Each of the photosensitive drums 1Y, 1M, 1C and 1K is rotationally driven in a predetermined rotational direction A. The process units 11Y, 11M, 11C and 11K have substantially the same configurations, except that toner as developer accommodated in the developing devices 4Y, 4M, 4C and 4K is different from each other.

The transfer unit 15 includes the intermediary transfer belt 6 as an intermediary transfer member, the secondary transfer roller 9 as a transfer means (secondary transfer means), primary transfer rollers 5Y, 5M, 5C and 5K, a plurality of rollers 20, 21, 22, 23, 24 and 25 and a belt cleaner 12. The intermediary transfer belt 6 is stretched over the plurality of rollers 20, 21, 22, 23, 24 and 25. The primary transfer rollers 5Y, 5M, 5C and 5K are disposed on an inner surface side of the intermediary transfer belt 6 and at positions corresponding to the photosensitive drums 1Y, 1M, 1C and 1K, respectively. Between the primary transfer rollers 5Y, 5M, 5C and 5K and the corresponding photosensitive drums 1Y, 1M, 1C and 1K, primary transfer portions are formed. The roller 20 is a tension roller which applies appropriate tensile force to the intermediary transfer belt 6. The roller 22 is a driving roller which rotationally drives the intermediary transfer belt 6 in a predetermined rotational direction G. The secondary transfer roller 9 contacts an outer surface of the intermediary transfer belt 6 and disposed so as to nips the intermediary transfer belt 6 together with the opposite roller 21 (secondary transfer opposite roller). As a nip portion between the secondary transfer roller 9 and the intermediary transfer belt 6, a secondary transfer portion T2 as a transfer portion in which a toner image is transferred to the sheet S is formed.

The image forming apparatus 100 is provided with a transfer power source 10 as a voltage applying unit to form a bias electric field in the secondary transfer portion T2 for transfer of the toner image. In the present Embodiment, the secondary transfer roller 9, which is an outer roller of the secondary transfer portion T2, is electrically connected to the transfer power source 10, and a predetermined transfer voltage is applied thereto from the transfer power source 10. The transfer voltage is voltage having reverse polarity to normal charging polarity of the toner used for the image formation. On the other hand, the opposite roller 21, which is an inner roller of the secondary transfer portion T2, is electrically connected to ground potential GND (metal frame, etc.) of the image forming apparatus 100. Incidentally, the inner roller of the secondary transfer portion T2 may be connected to the transfer power source 10, and the outer roller of the secondary transfer portion T2 may be connected to the ground potential GND. In this case, transfer voltage having the same polarity as the normal charging polarity of the toner is applied to the inner roller.

The image forming apparatus 100 further includes an accommodating portion 63 (storage, cassette), which accommodates the sheet S, a feeding unit 64, which feeds the sheet S, and a registration roller 8, which performs registration (positional alignment) of the sheet S. In addition, the image forming apparatus 100 includes a pre-fixing conveyance device 41, which conveys the sheet S which has passed through the secondary transfer portion T2, a fixing device 40, which fixes the toner image onto the sheet S, and a discharging roller pair 42 as a discharging unit, which discharges the sheet S outside the image forming apparatus 100.

The feeding unit 64 includes, for example, a pickup roller 65, which picks up an uppermost sheet S from the accommodating portion 63 in a sheet feeding direction, and a separating roller pair 66, which conveys the picked up sheet S while separating the sheet S one at a time. The separating roller pair 66 includes a conveyance roller, which conveys the uppermost sheet S in the sheet conveyance direction, and a separating roller, which is in contact with the conveyance roller and forms a separation nip together with the conveyance roller. The separating roller prevents a plurality of the sheets S from being conveyed by preventing the sheets S other than the uppermost sheet S from passing through the separation nip by applying frictional force to the sheet S in the separation nip. The separating roller is an example of a separating member which separates the sheets S and, for example, an elastic member having a pad shape (rubber pad) may be used as the separating member.

The fixing device 40 is a device of heat fixing type, which includes a fixing nip in which the toner image on the sheet S is heated while the sheet S is nipped and conveyed. The fixing device 40 includes a heating member, which contacts a surface of the sheet S on which the toner image is formed, a pressing member, which forms the fixing nip together with the heating member, and a heat source, which heats the heating member. For the heating member and the pressing member, for example, a belt member stretched over a plurality of rollers or a roller member having rigidity may be used. For the heat source, for example, a halogen lamp or an induction heating mechanism of IH type may be used.

In addition, the image forming apparatus 100 is also provided with a user operating portion 102, which is a user interface of the image forming system 400. The user operating portion 102 includes a display portion such as a liquid crystal panel, which displays information to the user, and an input portion, such as a physical button and a touch panel function of the liquid crystal panel, which receives input of information from the user. The user can set setting information and execution conditions for image forming operation to the image forming system 400 by operating the user operating portion 102. The setting information is attribute information of the sheet S accommodated in the accommodating portion 63 such as, for example, a size, material and brand name. The execution conditions for image forming operation include, for example, a value of the transfer voltage.

Upon an execution instruction of the image formation being input from a user, a control portion of the image forming apparatus 100 starts an image forming job, which is a series of tasks in which while the sheet S is conveyed one at a time, the image is formed thereon and the product is output. Hereinafter, a series of operations in which the image is formed onto the sheet S by the image forming apparatus

100 is referred to as an image forming operation. The image forming job includes the image forming operation onto at least one sheet S.

In the image forming operation, the toner images of each color are formed in the process units 11Y, 11M, 11C and 11K. Specifically, the photosensitive drums 1Y, 1M, 1C and 1K are rotationally driven, and the charging devices 2Y, 2M, 2C and 2K uniformly charge the surfaces of the photosensitive drums 1Y, 1M, 1C and 1K, respectively. The exposure devices 3Y, 3M, 3C and 3K expose the photosensitive drums 1Y, 1M, 1C and 1K based on image information, which is input together with the execution instruction, and the electrostatic latent images are formed on the surfaces of the photosensitive drums 1Y, 1M, 1C and 1K, respectively. The developing devices 4Y, 4M, 4C and 4K supply the toner of yellow, magenta, cyan and black to the photosensitive drums 1Y, 1M, 1C and 1K to develop the electrostatic latent images into the toner images of each color, respectively.

Incidentally, in the present Embodiment, a reverse developing type is used. That is, after the charging device charges the surface of the photosensitive drum to the same polarity as the normal charging polarity of the toner, potential of an exposed area exposed by the exposure device is attenuated, and the toner adheres to the exposed area upon the development.

The toner images formed in each process unit 11Y, 11M, 11C and 11K are primary transferred from the photosensitive drums 1Y, 1M, 1C and 1K to the intermediary transfer belt 6 in the primary transfer portion. To the primary transfer rollers 5Y, 5M, 5C and 5K, the transfer voltage having the reverse polarity to the normal charging polarity of the toner is applied by constant voltage control.

In the present Embodiment, the primary transfer rollers 5Y, 5M, 5C and 5K are conductive rollers, which include a core metal and a conductive elastic layer formed on an outer periphery side of the core metal. The elastic layer is made of, for example, ion-conductive foam rubber. The ion-conductive foam rubber is foam rubber material in which a conductive agent, which manifests ion conductivity, is dispersed. For the conductive agent and the foam rubber material, known material for the transfer roller may be used. For each of the primary transfer rollers, for example, a roller which has an outer diameter from 15 to 20 mm and a resistance value from 1E+5 to 1E+8 Ω when the voltage of 2 kV is applied under environmental condition of 23° C. and 50% RH may be suitably used.

The intermediary transfer belt 6 is rotationally driven at a predetermined peripheral speed (process speed), which is equal to peripheral speeds of the photosensitive drums 1Y, 1M, 1C and 1K. In the present Embodiment, the peripheral speed is from 150 to 470 mm/sec. By the toner image of another color being transferred over the toner image, which is transferred on an upstream side of the primary transfer portion as the intermediary transfer belt 6 is rotated, a full-color toner image is formed on the intermediary transfer belt 6. The full-color toner image is carried by the intermediary transfer belt 6 and conveyed toward the secondary transfer portion T2.

In parallel with the toner image formation in the image forming portion 101, the feeding unit 64 feeds the sheet S one at a time toward the image forming portion 101. The fed sheet S is conveyed to the secondary transfer portion T2 by the registration roller 8 in synchronization with a timing when the toner image on the intermediary transfer belt 6 is conveyed to the secondary transfer portion T2. Then, the toner image is transferred (secondary transfer) from the intermediary transfer belt 6 to the sheet S in the secondary transfer portion T2.

In the present Embodiment, the secondary transfer roller 9 is a conductive roller which includes a core metal and a conductive elastic layer formed on an outer periphery side of the core metal. The elastic layer is made of, for example, ion-conductive foam rubber. The ion-conductive foam rubber is foam rubber material in which a conductive agent, which manifests ion conductivity, is dispersed. For the conductive agent and the foam rubber material, known material for the transfer roller may be used. For the secondary transfer roller 9, for example, a roller which has an outer diameter from 20 to 25 mm and a resistance value from 1E+5 to 1E+8 Ω when voltage of 2 kV is applied under environmental condition of 23° C. and 50% RH may be suitably used.

In addition, the opposite roller 21 is a conductive rubber roller which includes a core metal and an elastic layer of electroconductive foam rubber formed on an outer periphery side of the core metal. The electroconductive foam rubber is foam rubber material in which a conductive agent, which manifests electron conductivity, is dispersed. For the conductive agent and the foam rubber material, known material for the transfer roller may be used. For the opposite roller 21, for example, a roller which has an outer diameter from 20 to 22 mm and a resistance value from 1E+5 to 1E+8 Ω when voltage of 50V is applied under environmental condition of 23° C. and 50% RH may be suitably used.

During the secondary transfer, to the secondary transfer roller 9, the transfer voltage having the reverse polarity to the normal charging polarity of the toner is applied from the transfer power source 10 by the constant voltage control. The transfer voltage is, for example, from +1 to +7 kV and is automatically adjusted so that current from +40 to +120 μA flows from the secondary transfer roller 9 to the opposite roller 21. By the application of the transfer voltage, the bias electric field is formed in the secondary transfer portion T2, in which potential of the secondary transfer roller 9 becomes reverse polarity to the normal charging polarity of the toner with respect to the intermediary transfer belt 6. By this bias electric field, electrostatic force in a direction approaching to the secondary transfer roller 9 is acted on the toner on the intermediary transfer belt 6. Then, by the toner being transferred from the intermediary transfer belt 6 to the sheet S passing through the secondary transfer portion T2, the toner image is transferred to the sheet S.

Incidentally, just before the secondary transfer portion T2, a conveyance guide 11 is provided to improve positioning accuracy of the sheet S with respect to the intermediary transfer belt 6. In addition, transfer residual toner which remains on the intermediary transfer belt 6 without being transferred to the sheet S is collected by the belt cleaner 12 and reused for the image formation.

The sheet S having passed through the secondary transfer portion T2 is conveyed to the fixing device 40 by the pre-fixing conveyance device 41, and the toner image is subjected to a fixing process by the fixing device 40. The fixing process is a process in which the toner image on the sheet S is heated and pressed while the sheet S is nipped and conveyed in the nip portion of the fixing device 40. The pre-fixing conveyance device 41 carries and conveys the sheet S on an endless rubber belt, for example. For the rubber belt, ethylene propylene diene rubber (EPDM) having a width from 100 to 110 mm and a thickness from 1 to 3 mm may be used. In addition, the rubber belt has holes having a diameter from 3 to 7 mm, and by generating negative pressure inside the rubber belt using a fan, the sheet S can be stably carried on the rubber belt.

The sheet S, which has passed through the fixing device 40, is discharged by the discharging roller pair 42 toward the charge-eliminating apparatus 300.

The image forming portion 101 of intermediary transfer type described above is an example of an image forming unit which forms the image on the sheet S, and the image forming unit may be an electrophotographic unit of direct transfer type, for example. In this case, the toner image formed on the photosensitive drum as the image bearing member is directly transferred from the photosensitive drum to the sheet S in a transfer nip (transfer portion) in which the photosensitive drum and the transfer roller are opposite to each other. In the transfer nip, a bias electric field, in which potential of the transfer roller becomes the reverse polarity to the normal charging polarity of the toner with respect to the photosensitive drum, is formed.

Charge-Eliminating Apparatus

Figure 2:
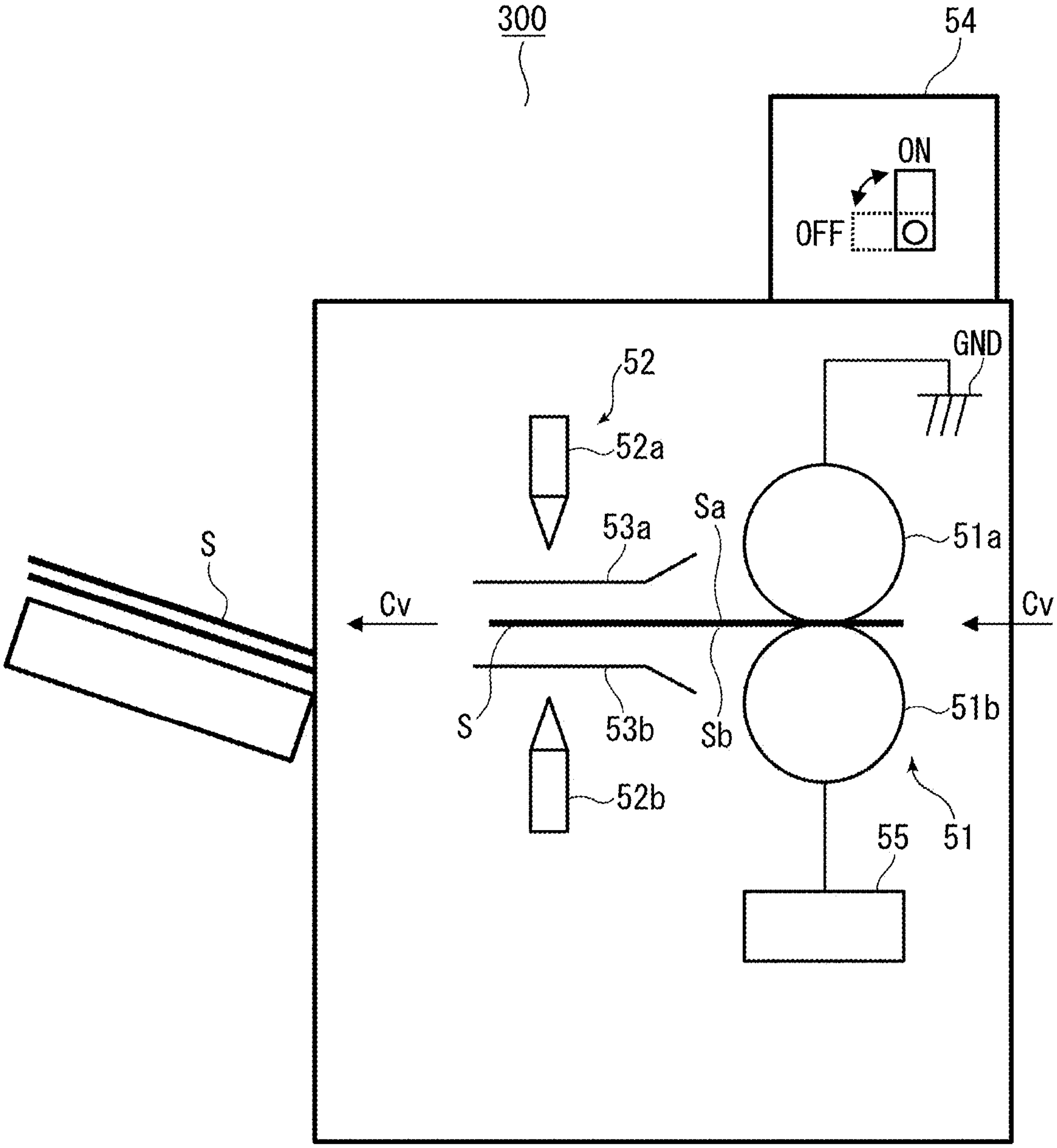
FIG. 2 is a schematic view of a charge-eliminating apparatus according to the Embodiment 1.

FIG. 2 is a schematic view of the charge-eliminating apparatus 300 in the present Embodiment. The charge-eliminating apparatus 300 is provided with a charge-eliminating roller pair 51 as a charge-eliminator of contact type, an ionizer portion 52 as a charge-eliminator of non-contact type and a high voltage power source 55.

The charge-eliminating roller pair 51 includes a charge-eliminating opposite roller 51*a* (second opposite roller), which contacts a first surface Sa of the sheet S and a charge-eliminating roller 51*b*, which contacts a second surface Sb opposite to the first surface Sa of the sheet S. The charge-eliminating roller 51*b* is a charge-eliminating member of contact type which contacts the conveyed sheet S and eliminates charge of the sheet S. The charge-eliminating opposite roller 51*a* is in contact with the charge-eliminating roller 51*b*, and a charge-eliminating nip as a nip portion between the charge-eliminating roller 51*b* and the charge-eliminating opposite roller 51*a* is formed. The charge-eliminating roller pair 51 performs charge-eliminating of the sheet S while nipping and conveying the sheet S in the charge-eliminating nip.

The charge-eliminating opposite roller 51*a* is connected to the ground potential GND. The charge-eliminating opposite roller 51*a* is, for example, electrically connected to a metal frame of the charge-eliminating apparatus 300. The charge-eliminating roller 51*b* is connected to the high voltage power source 55. The high voltage power source 55 is a voltage applying unit which applies voltage (charge-eliminating voltage) to the charge-eliminating roller 51*b* to perform charge-eliminating of the sheet S.

Incidentally, it may be configured that the charge-eliminating roller 51*b* is disposed so as to contact the first surface Sa of the sheet S and the charge-eliminating opposite roller 51*a* is disposed so as to contact the second surface Sb of the sheet S. In that case, voltage applied to the charge-eliminating roller 51*b* becomes reverse polarity to the voltage applied to the charge-eliminating roller 51*b* in the present Embodiment.

In the present Embodiment, the charge-eliminating roller 51*b* is a conductive roller which includes a core metal and a conductive elastic layer formed on an outer periphery side of the core metal. The elastic layer is made of, for example, ion-conductive foam rubber. The ion-conductive foam rubber is foam rubber material in which a conductive agent, which manifests ion conductivity, is dispersed. For the conductive agent and the foam rubber material, known material may be used. For the charge-eliminating roller 51*b*, for example, a roller which has an outer diameter from 20 to 25 mm and a resistance value from 1E+5 to 1E+8 Ω when voltage of 2 kV is applied under environmental condition of 23° C. and 50% RH may be suitably used. The charge-eliminating opposite roller 51*a* is made of stainless steel (SUS), and, for the charge-eliminating opposite roller 51*a*, a roller which has an outer diameter from 20 to 25 mm is used. Incidentally, as the charge-eliminating roller 51*b*, a roller made of metallic material such as stainless steel may be used.

The ionizer portion 52 includes a first ionizer 52*a* opposing the first surface of the sheet S and a second ionizer 52*b* opposing the second surface of the sheet S. Each of the first ionizer 52*a* and the second ionizer 52*b* includes an electrode needle, and by applying voltage to the electrode needle, corona electric discharge is generated from a tip of the needle, causing air around the tip of the needle to be ionized. Then, by the generated ions neutralizing the electric charge on the surface of the sheet S, the charge of the sheet S is eliminated.

Figure 3:
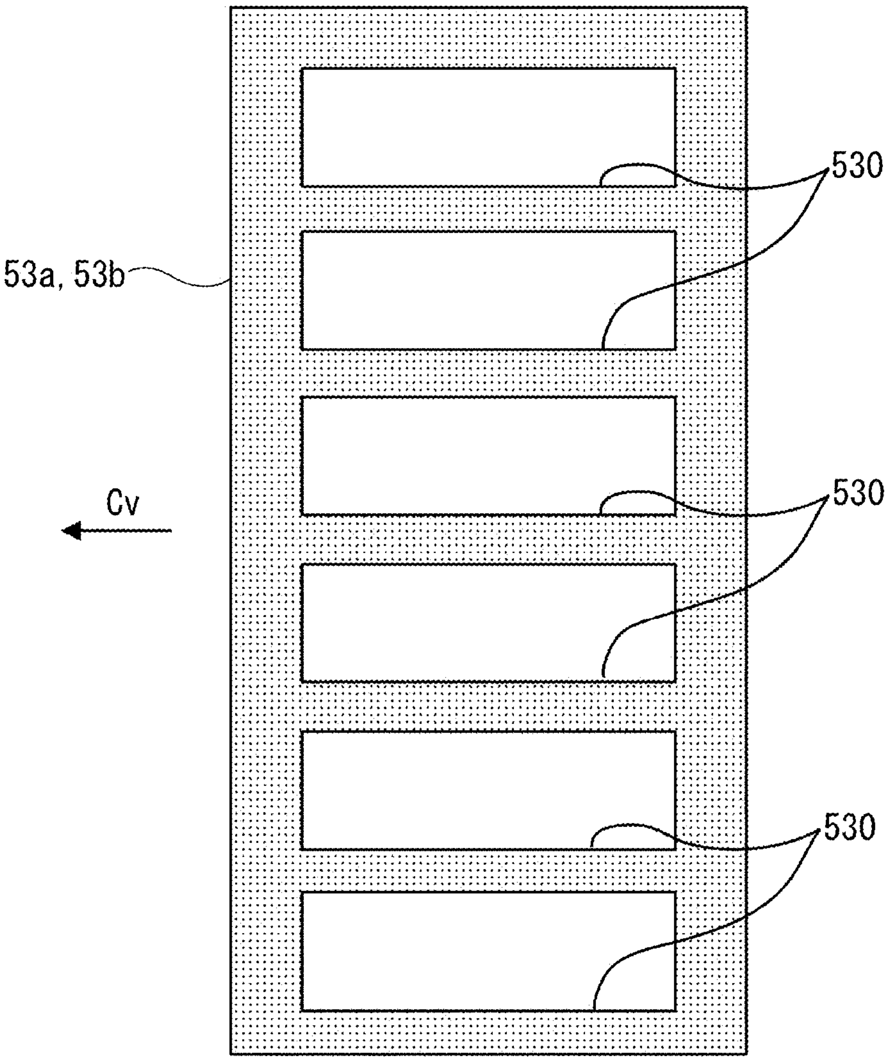
FIG. 3 is a schematic view of a conveyance guide according to the Embodiment 1.

As the ionizer portion 52 in the present Embodiment, bar type ionizers IZS40 (manufactured by SMC Corporation) are disposed above and below a sheet conveyance path as the first ionizer 52*a* and the second ionizer 52*b*. Conveyance guides 53*a* and 53*b*, which form the sheet conveyance path in the ionizer portion 52, are made of, for example, resin synthesized from PC (polycarbonate) and ABS (acrylonitrile-butadiene-styrene). Volume resistivities of the conveyance guides 53*a* and 53*b* are, for example, $1\times10^{14}$ Ω cm. Furthermore, as shown in FIG. 3, to each of the conveyance guides 53*a* and 53*b*, a plurality of holes 530 in order for the ions emitted from the first ionizer 52*a* and the second ionizer 52*b* not to be physically shielded are formed. The plurality of holes 530 are disposed side by side in a sheet widthwise direction, which is perpendicular to a sheet conveyance direction Cv.

The first ionizer 52*a* and the second ionizer 52*b* described above are examples of the charge-eliminator of non-contact type, and other charge-eliminators of non-contact type may be used. For example, a charge-eliminator of corotron type or scorotron type, which eliminates charge of a sheet by corona electric discharge from an electric discharging wire, may be used. In addition, it is not necessarily for the charge-eliminator of non-contact type to be provided on both sides of the conveyance path but, for example, it may be a configuration in which the charge-eliminating apparatus 300 includes only the first ionizer 52*a* as the charge-eliminator of non-contact type. In addition, in a case in which the charge of the sheet S can be sufficiently eliminated by the charge-eliminating roller 51*b*, the charge-eliminator of non-contact type may be omitted.

For the sheet S conveyed from the image forming apparatus 100 to the charge-eliminating apparatus 300, firstly most of the electric charge thereof is removed (roughly removed) by the charge-eliminating nip of the charge-eliminating roller pair 51. Specifically, the charge-eliminating voltage is set to reverse polarity to the transfer voltage, which is applied to the secondary transfer roller 9. A value of the charge-eliminating voltage is set in a range from −1 kV to −6 kV.

Immediately after passing through the secondary transfer portion T2 (FIG. 1), normally, the first surface Sa of the sheet S, which has contacted the intermediary transfer belt 6, is charged to negative polarity, and the second surface Sb, which has contacted the secondary transfer roller 9, is charged to positive polarity. By the charge-eliminating voltage of the reverse polarity to the transfer voltage being applied to the charge-eliminating roller 51*b*, between the charge-eliminating roller 51_b_ and the charge-eliminating opposite roller 51_a_, current flows so that positive electric charge is supplied to the first surface Sa of the sheet S and negative electric charge is supplied to the second surface Sb. In this manner, by the current flowing via the sheet S in the charge-eliminating nip by the application of the charge-eliminating voltage to the charge-eliminating roller 51_b_, an electrification charge amount of the sheet S, which is an amount of charge beard on the first surface Sa and the second surface Sb of the sheet S, is reduced.

The sheet S, which has passed through the charge-eliminating roller pair 51, is further subjected to charge-eliminating in the ionizer portion 52. Specifically, by the ions being irradiated from the first ionizer 52_a_ and the second ionizer 52_b_, residual charge on the first surface Sa and the second surface Sb of the sheet S is neutralized, and the electrification charged amount of the sheet S is further reduced. The sheet S which has passed through the ionizer portion 52 is discharged outside of the charge-eliminating apparatus 300.

Detecting Method of the Electrification Charge Amount and Control Method of the Charge-Eliminating Voltage In the present Embodiment, a detecting mode, in which detection of the electrification charge amount using the charge-eliminating roller 51_b_ is performed, can be executed. In other words, a control circuit 200 can execute a normal mode (first mode), in which the charge-eliminating of the sheet S (the sheet S which is to be the product) is performed, and a detecting mode (second mode), in which the detection of the electrification charge amount of the sheet S (the sheet S for measurement) is performed. The detecting mode is a mode in which the electrification charge amount of the sheet is detected based on a detecting result of a voltage detecting circuit 55V (detecting unit) while the sheet passes through the charge-eliminating roller 51_b_ (charge-eliminating member).

In addition, in the detecting mode in the present Embodiment, a value of the charge-eliminating voltage in the normal mode is determined so that the charge-eliminating voltage to be applied to the charge-eliminating roller 51_b_ in order to eliminate the charge of the sheet S is a value which corresponds to the electrification charge amount of the sheet S. In other words, the control circuit 200 can execute the normal mode (first mode), in which the charge-eliminating of the sheet S (the sheet S which is to be the product) is performed, and the mode, in which the value of the charge-eliminating voltage is automatically determined (second mode, adjusting mode). In the detecting mode in the present Embodiment, the value of the charge-eliminating voltage to be applied to the charge-eliminating roller 51_b_ (charge-eliminating member) by the high voltage power source 55 (voltage applying unit) in the normal mode is determined based on the detecting result of the voltage detecting circuit 55V (detecting unit) while the sheet passes through the charge-eliminating roller 51_b_ (charge-eliminating member).

Incidentally, the electrification charge amount of the sheet S and surface potential of the sheet S are usually proportional. In addition, the electrification charge amount of the sheet S may be expressed as an amount of electric charge per unit area of the sheet surface (surface electric charge density). Therefore, the "electrification charge amount" of the sheet S in the description below may be replaced to the surface potential of the sheet S or the surface electric charge density of the sheet S.

The detecting mode is automatically executed, for example, when the image forming job is input, before the image is formed on the sheet S which is to be the product. Alternatively, the detecting mode may be executed, as an operation independent of the image forming job, based on an operation of the user operating portion 102 by a user.

Hereinafter, the voltage applied from the high voltage power source 55 to the charge-eliminating roller 51_b_ in the detecting mode is referred to as "high voltage for detection" and is distinguished from the charge-eliminating voltage applied from the high voltage power source 55 to the charge-eliminating roller 51_b_ in the normal mode.

Figure 4:
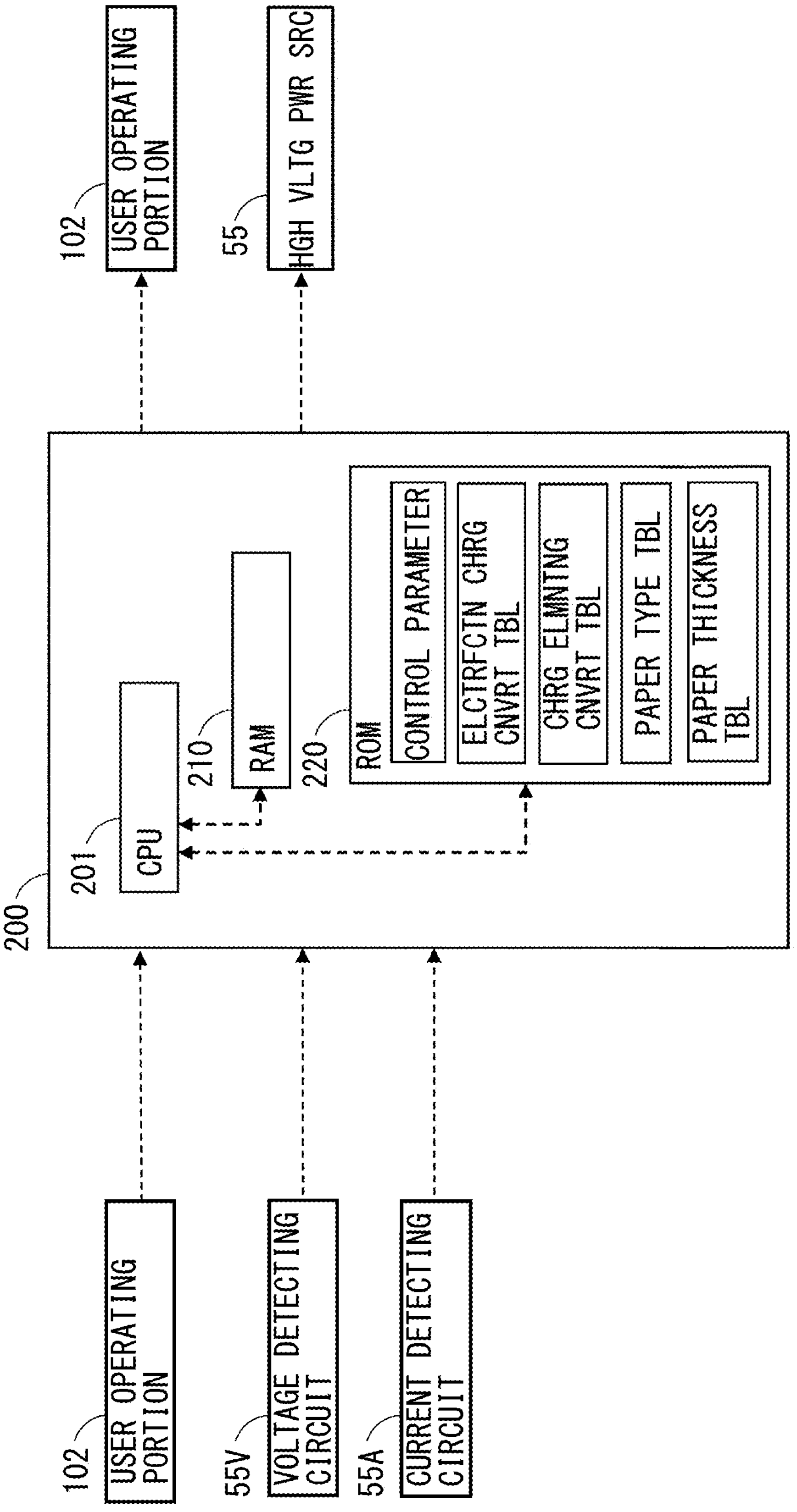
FIG. 4 is a block diagram of a control system according to the Embodiment 1.

In FIG. 4, a block diagram of the control circuit 200 according to the present Embodiment is illustrated. The control circuit 200 is an example of a control unit which controls an operation of the charge-eliminating apparatus 300. The control circuit 200 may be mounted on a main assembly of the charge-eliminating apparatus 300, or a part or all of functions of the control circuit 200 may be installed in the image forming apparatus 100.

As shown in FIG. 4, the control circuit 200 includes a CPU 201, a RAM 210 and a ROM 220. The CPU 201 is an executing means which reads out and executes control programs. The RAM 210 provides a working area upon the CPU 201 executing the control programs. The ROM 220 is an example of a memory portion which memorizes various types of information such as setting information related to control of the charge-eliminating apparatus 300. In addition, the control circuit 200 is connected to the user operating portion 102, an operating portion for charge-eliminating 54, the high voltage power source 55 and the transfer power source 10. The operating portion for charge-eliminating 54 will be described in detail in an Embodiment 2.

More specifically, the CPU 201 obtains information such as information related to the image forming job (job information), a value of current flowing through the charge-eliminating roller 51_b_ when the charge-eliminating voltage is applied thereto (referred to as charge-eliminating current), a value of the transfer voltage output by the transfer power source 10, and stores the information in the RAM 210. Here, the job information is, for example, attribute information of the sheet S which is input by a user via the user operating portion 102 and is used for a current image forming job. In a case of a period when the sheet S is passing through the charge-eliminating nip (during paper passing), the value of the charge-eliminating current corresponds to an amount of electric charge supplied from the charge-eliminating roller 51_b_ to the sheet S per unit time.

The CPU 201 causes the high voltage power source 55 to apply the high voltage for detection to the charge-eliminating roller 51_b_ during a period when the sheet S for detection passes through the charge-eliminating nip and during periods before and after the period. Based on the detecting result of a current detecting circuit 55A or the voltage detecting circuit 55V while the sheet S for detection passes through the charge-eliminating roller 51_b_, the CPU 201 determines the voltage (charge-eliminating voltage) to be applied to the charge-eliminating roller 51_b_ by the high voltage power source 55 when the charge-eliminating roller 51_b_ eliminates the charge of the sheet S.

In the present Embodiment, the high voltage power source 55 is capable of output control with the constant voltage control in a range from 0 kV to −6 kV and constant current control in a range from 0 μA to −100 μA. In addition, to the high voltage power source 55, the voltage detecting circuit 55V, which is capable of detecting the value of the voltage applied from the high voltage power source 55 to the charge-eliminating roller 51_b_, and the current detecting circuit 55A, which is capable of detecting current flowing through the charge-eliminating roller 51b due to the application of the voltage from the high voltage power source 55, are provided.

The voltage detecting circuit 55V and the current detecting circuit 55A are examples of detecting units which detect voltage applied to the charge-eliminating member or current flowing through the charge-eliminating member. As described below, in the present Embodiment, control using the detecting result of the voltage by the voltage detecting circuit 55V is mainly performed.

Control Flow

Figure 5:
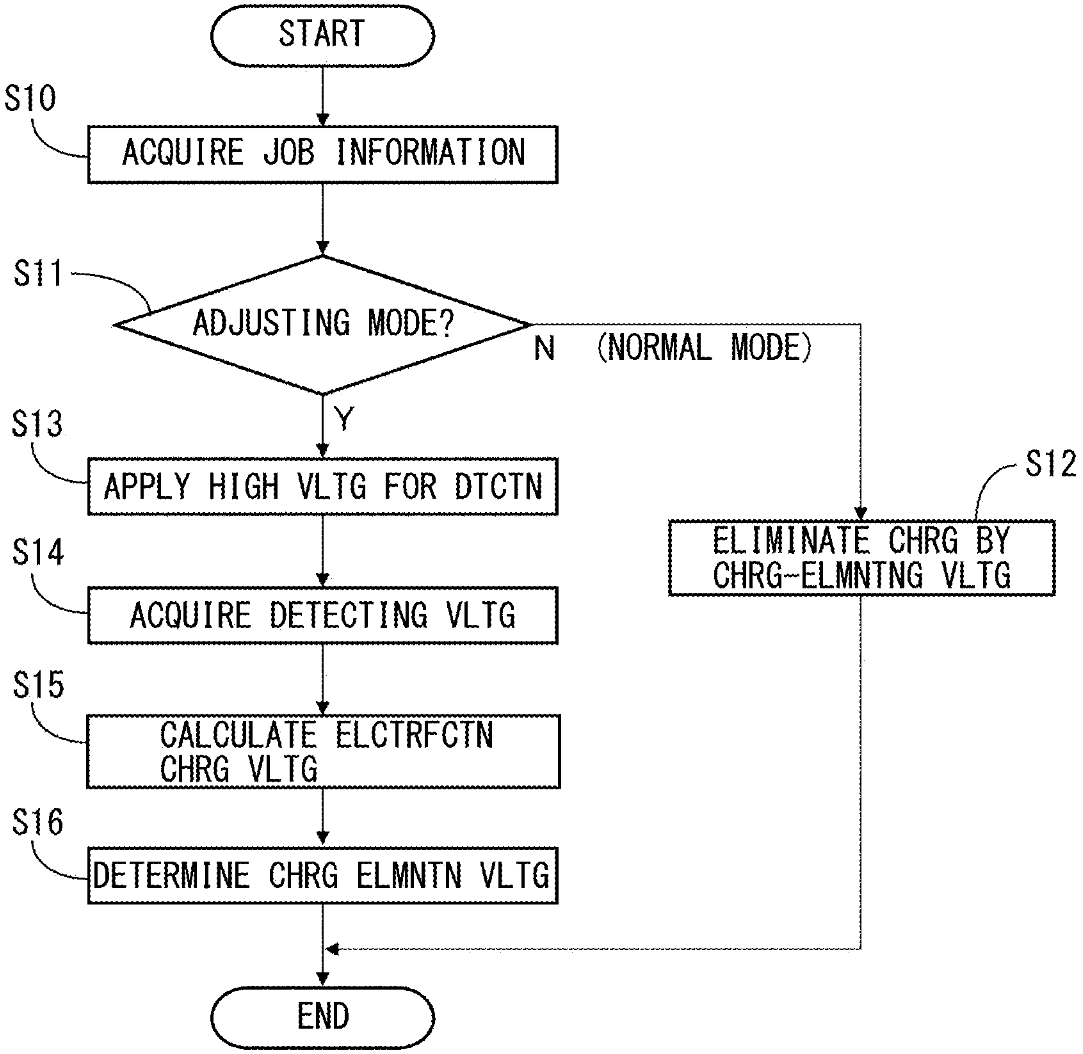
FIG. 5 is a flowchart illustrating a control method according to the Embodiment 1.

A control procedure performed by the control circuit 200 will be described according to a flowchart in FIG. 5. Hereinafter, an executing entity for each process in the present flow is, unless otherwise specified, the CPU 201.

In the present Embodiment, by operating the user operating portion 102, a user can instruct the control circuit 200 to execute the detecting mode as an independent operation of the image forming job. When an instruction for execution of the image forming job or the detecting mode is input to the image forming system 400, the process of the present flow is started. First, the CPU 201 obtains the job information which is set via the user operating portion 102 (S10). In the job information, information which indicates that a current job is the image forming job or the detecting mode.

If the current job is the image forming job (S11N), then the CPU 201 causes the charge-eliminating apparatus 300 to operate in the normal mode (S12). That is, the CPU 201 causes the high voltage power source 55 to apply the charge-eliminating voltage to the charge-eliminating roller 51b in order to eliminate the charge of the sheet S, on which the image is formed by the image forming apparatus 100, in the charge-eliminating nip. The value of the charge-eliminating voltage is, for example, the value recorded in the RAM 210 in the detecting mode which is previously performed. If the detecting mode has not been executed, or if an operation to reset the value recorded in the RAM 210 has been performed, for the value of the charge-eliminating voltage, a value stored in advance in a table in the ROM 220 is used. The operation to reset the value recorded in the RAM 210 is, for example, turning off of the charge-eliminating apparatus 300.

If the current job is the detecting mode (S11Y), then the CPU 201 causes the image forming apparatus 100 to form an image (image for test) on the sheet S in a process similar to the normal image forming operation. On the other hand, the CPU 201 causes the high voltage power source 55 to apply the high voltage for detection to the charge-eliminating roller 51b during the period when a first sheet S in the image forming job passes through the charge-eliminating nip and during the periods before and after the period (S13). In the present Embodiment, the high voltage for detection is applied by the constant current control at a preset current value in a range from −10 μA to −30 μA, for example. Then, a fluctuation of the value of the voltage when the sheet S passes through the charge-eliminating nip during the period when the high voltage for detection is applied is measured (S14).

The fluctuation amount of the value of the voltage while the sheet S passes through the charge-eliminating nip is referred to as "detected voltage". That is, the detected voltage is a value obtained, in a state in which the voltage being applied to the charge-eliminating roller 51b by the constant current control, by subtracting a detected value of the voltage detecting circuit 55V when the sheet S does not pass through the charge-eliminating nip (the charge-eliminating roller 51b) from a detected value of the voltage detecting circuit 55V while the sheet S passes through the charge-eliminating nip.

The CPU 201 records the detected voltage obtained in S14 in the RAM 210 as the detecting result. Then, the CPU 201 calculates the electrification charge amount of the sheet S and the value of the charge-eliminating voltage based on the detected voltage obtained in S14 and an electrification charge conversion table and a charge-eliminating voltage conversion table (FIG. 4) stored in the ROM 220 (S15, S16).

The value of the charge-eliminating voltage obtained in S16 is recorded in the RAM 210 as an adjusted value of the charge-eliminating voltage. In a case in which the image forming job is input after the execution of the detecting mode and the charge-eliminating apparatus 300 is operated in the normal mode, the charge-eliminating voltage is applied to the charge-eliminating roller 51b from the high voltage power source 55 using the adjusted value of the charge-eliminating voltage recorded in the RAM 210 (S12).

In this manner, the voltage detecting circuit 55V as a detecting unit detects the voltage applied to the charge-eliminating roller 51b (charge-eliminating member). The control circuit 200 (control unit) calculates the electrification charge amount of the sheet S based on the fluctuation amount of the voltage detected by the voltage detecting circuit 55V while the sheet S passes through the charge-eliminating roller 51b in the state in which the voltage is applied to the charge-eliminating roller 51b in the detecting mode (second mode). By this, it becomes possible for the charge-eliminating apparatus 300 to detect the electrification charge amount of the sheet S automatically.

In addition, the control circuit 200 (control unit) determines the value of the charge-eliminating voltage for the normal mode (first mode) based on the fluctuation amount of the voltage detected by the voltage detecting circuit 55V while the sheet passes through the charge-eliminating roller 51b in the state in which the voltage is applied to the charge-eliminating roller 51b in the detecting mode (second mode). By this, according to the electrification charge amount of the sheet S, the charge-eliminating voltage is automatically set to a value which is appropriate to perform the charge-eliminating of the sheet S.

Reason why the Electrification Charge Amount can be Detected

Reason why the electrification charge amount of the sheet S can be determined based on the fluctuation amount of the value of the voltage of the high voltage for detection (detected voltage) while the sheet S passes through the charge-eliminating nip (the charge-eliminating roller 51b) will be described. The sheet S is affected by the electric field in the secondary transfer portion T2. In the secondary transfer portion T2, the electric field is formed so that the potential of the secondary transfer roller 9 becomes the reverse polarity to the normal charging polarity of the toner with respect to the intermediary transfer belt 6. Hereinafter, it is assumed that the normal charging polarity of the toner is negative polarity. In the secondary transfer portion T2, a side of a surface of the sheet S (first surface Sa, image surface), to which the toner image is transferred, has the negative polarity, and a side of the back surface thereof (second surface Sb, non-image surface) is affected by the electric field, which has the positive polarity.

In a case in which a resistance value of the sheet S is low, for example, positive electric charge, which is supplied from the secondary transfer roller 9 to the second surface Sb of the sheet S can move through the sheet S in a thickness direction thereof and exit from the first surface Sa to the intermediary transfer belt 6. As a result, in the case in which the resistance value of the sheet S is low, most of the positive electric charge supplied to the second surface Sb of the sheet S exits to the intermediary transfer belt 6, except an amount of the positive electric charge, which is necessary for the transfer of the toner image. Therefore, in the case in which the resistance value of the sheet S is low, the electrification charge amounts of the first surface Sa and the second surface Sb of the sheet S do not become large values.

In a case in which the resistance value of the sheet S is high, however, the positive electric charge supplied from the secondary transfer roller 9 to the second surface Sb of the sheet S is likely to remain on the second surface Sb. On the first surface Sa of the sheet S, dielectric polarization occurs in response to the positive electric charge on the second surface Sb, and negative electric charge is distributed on the first surface Sa. In addition, in the case in which the resistance value of the sheet S is high, after the sheet S exits the secondary transfer portion T2, the electrification charge amounts on the first surface Sa and the second surface Sb are still maintained without experiencing much attenuation.

Incidentally, an example of the sheet S, of which the resistance value is high, is a sheet made of synthetic resin, such as a plastic film and a synthetic paper. These sheets are typical examples of the sheets, for which it is highly necessary to perform the charge-eliminating by the charge-eliminating apparatus 300. This is because, for these sheets, if the charge-eliminating is not performed, the sheet is discharged to a discharge tray, etc. with the electrification charge amount on the surface of the sheet remaining large, and it is likely for the sheets to stick to each other due to electrostatic adsorption force.

Relationship between voltage and current in the case in which the sheet S which is charged passes through the charge-eliminating nip in the state in which the voltage is applied to the charge-eliminating roller 51*b* is different from relationship between voltage and current in a case in which the sheet S which is not charged passes through the charge-eliminating nip. That is, the applied voltage required to apply current to the charge-eliminating roller 51*b* at a specific current value while the sheet S is passing through the charge-eliminating nip varies depending on the resistance value of the sheet S, the electrification charge amount of the sheet S and the polarity of the charge.

For example, considering a case in which negative electric charge is supplied to the charge-eliminating roller 51*b* (high voltage for detection of negative polarity is applied) in a state in which the sheet S is charged so that the first surface Sa bears negative electric charge and the second surface Sb bears positive electric charge. In this case, the sheet S acts as a capacitor and the electric charge stored on the first surface Sa and the second surface Sb is released when the sheet S passes through the charge-eliminating nip. As a result, more electric charge is likely to move along a potential gradient generated by the application of the voltage to the charge-eliminating roller 51*b*. That is, if the applied voltage is constant, the current flowing through the charge-eliminating roller 51*b* gets increased by the current induced by the electric charge on the surface of the sheet while the sheet S passes through the charge-eliminating nip.

In other words, the applied voltage required to apply the current to the charge-eliminating roller 51*b* at a predetermined current value while the sheet S passes through the charge-eliminating nip varies depending on the electrification charge amount of the sheet S. The applied voltage required to apply current to the charge-eliminating roller 51*b* at a predetermined current value (e.g., −20 μA) in a case in which the sheet S, of which the first surface Sa is charged to negative polarity and the second surface Sb is charged to positive polarity, passes through the charge-eliminating nip becomes lower than the applied voltage required to apply current to the charge-eliminating roller 51*b* at the same current value in a case in which the sheet S, which is not charged, passes through the charge-eliminating nip. Conversely, the applied voltage required to apply current to the charge-eliminating roller 51*b* at a predetermined current value in a case in which the sheet S, of which the first surface Sa is charged to positive polarity and the second surface Sb is charged to negative polarity, passes through the charge-eliminating nip becomes higher than the applied voltage required to apply current to the charge-eliminating roller 51*b* at the same current value in the case in which the sheet S, which is not charged, passes through the charge-eliminating nip.

Relationship Between the Detected Voltage and the Electrification Charge Amount

In part (a) of FIG. 6, a result of a preliminary study of a relationship between a fluctuation amount of the value of the voltage of the high voltage for detection (detected voltage) while the sheet S passes through the charge-eliminating nip and the electrification charge amount of the sheet S is shown. Here, a sheet (synthetic paper), of which the resistance value is high, is charged with a pre-specified electrification charge amount by a charging unit prepared separately from the charge-eliminating apparatus 300. A horizontal axis in part (a) of FIG. 6 represents the electrification charge amount of the sheet as the electric charge density (electric charge amount per unit area of the sheet surface). And a detected voltage (vertical axis) while the charged sheet passes through the charge-eliminating nip is measured.

In the present Embodiment, the electrification charge conversion table indicating a corresponding relation between the detected voltage and the electrification charge amount, which is shown in part (a) of FIG. 6, is stored in the ROM 220 in the control circuit 200 (FIG. 4). In S14 of the flow (FIG. 5) described above, the CPU 201 can determine the electrification charge amount of the sheet S by using the detected voltage, which is acquired while the sheet S passes through the charge-eliminating nip, and referring to the electrification charge conversion table. In other words, the control circuit 200 (control unit) includes the ROM 220 (memory portion) which stores information indicating the corresponding relation between the fluctuation amount of the voltage and the electrification charge amount of the sheet S. In addition, the control circuit 200 detects the electrification charge amount of the sheet S based on the fluctuation amount of the voltage detected by the voltage detecting circuit 55V (detecting unit) and the information in the ROM 220.

Incidentally, in the present Embodiment, the information indicating the corresponding relation between the detected voltage and the electrification charge amount is prepared in a form of the table, however, it may be configured that the electrification charge amount is expressed as a function with the detected voltage as a variable and a coefficient of the function is stored as a control parameter in the ROM 220.

Relationship Between the Detected Voltage and the Charge-Eliminating Voltage

In part (b) of FIG. 6, a result of a preliminary study of a relationship between the fluctuation amount of the value of the voltage of the high voltage for detection (detected voltage) while the sheet S passes through the charge-eliminating nip and a value of the charge-eliminating voltage which is appropriate for eliminating the charge of the sheet S is illustrated. Similar to the case of the part (a) of FIG. 6, a sheet (synthetic paper), of which the resistance value is high, is charged with a pre-specified electrification charge amount by the charging unit prepared separately from the charge-eliminating apparatus 300. A horizontal axis in part (b) of FIG. 6 represents the detected voltage while the charged sheet passes through the charge-eliminating nip. A vertical axis in part (b) of FIG. 6 represents the value of the charge-eliminating voltage which corresponds to the electrification charge amount of the sheet S.

In the present Embodiment, the charge-eliminating voltage conversion table indicating a corresponding relation between the detected voltage and the charge-eliminating voltage, which is shown in part (b) of FIG. 6, is stored in the ROM 220 in the control circuit 200 (FIG. 4). In S14 of the flow (FIG. 5) described above, the CPU 201 can determine the value of the charge-eliminating voltage by using the detected voltage, which is acquired while the sheet S passes through the charge-eliminating nip, and referring to the charge-eliminating voltage conversion table. In other words, the control circuit 200 (control unit) includes the ROM 220 (memory portion) which stores information indicating the corresponding relation between the fluctuation amount of the voltage and the value of the voltage to be applied to the charge-eliminating roller 51*b* (charge-eliminating member). In addition, the control circuit 200 determines the value of the voltage to be applied to the charge-eliminating roller 51*b* by the high voltage power source 55 (voltage applying unit) in the normal mode based on the fluctuation amount of the voltage detected by the voltage detecting circuit 55V (detecting unit) and the information in the ROM 220.

Incidentally, in the present Embodiment, the information indicating the corresponding relation between the detected voltage and the charge-eliminating voltage is prepared in a form of the table, however, it may be configured that the charge-eliminating voltage is expressed as a function with the detected voltage as a variable and a coefficient of the function is stored as a control parameter in the ROM 220.

Difference Between the High Voltage for Detection and the Charge-Eliminating Voltage The voltage applied to the charge-eliminating roller 51*b* to determine the electrification charge amount of the sheet S (high voltage for detection) and the charge-eliminating voltage is subject to different voltage control than the voltage to be applied to the charge-eliminating roller 51*b* to perform the charge-eliminating of the sheet S (charge-eliminating voltage). Here, the "voltage control is different" means that at least one of control types of the voltage (the constant current control or the constant voltage control) and a presence or absence of a change of the value of the voltage according to the detecting result of the detecting unit is different.

In the present Embodiment, the charge-eliminating voltage is controlled by the constant voltage control. This is because it is easier to perform the charge-eliminating of the sheet S stably. For example, in the constant voltage control, there is no need to vary an output voltage value depending on a width of the sheet S (a length of the sheet in the sheet widthwise direction, which is perpendicular to the sheet conveyance direction Cv).

Meanwhile, the high voltage for detection is controlled by the constant current control. In addition, the high voltage for detection is a preset value (predetermined value stored in the ROM 220) regardless of the detecting result of the voltage detecting circuit 55V (detecting unit), whereas the value of the charge-eliminating voltage is changed based on the detecting result of the voltage detecting circuit 55V.

The charge-eliminating voltage is changed according to the electrification charge amount of the sheet S in order to perform the charge-eliminating of the sheet S properly. To the contrary, for a purpose of evaluating the electrification charge amount of the sheet S, it is acceptable for the high voltage for detection to be a predetermined value, not only that but, by fixing the high voltage for detection to the predetermined value, it becomes easier to perform the preliminary studies of the electrification charge conversion table, etc.

In a case in which the high voltage for detection is controlled by the constant voltage control, the detecting result may change due to factors other than the electrification charge amount, for example, such as changes in the resistance value of the charge-eliminating roller 51*b*. That is, even if the relationship between the detecting result (current value or fluctuation amount thereof) when the high voltage for detection is applied by the constant voltage control and the electrification charge amount or the charge-eliminating voltage is determined through the preliminary study, the result of the preliminary study may diverge while the charge-eliminating apparatus 300 is used for a long period of time.

In addition, in a case in which the high voltage for detection is controlled by the constant voltage control with the same voltage value as the charge-eliminating voltage, there may be a case in which the current flowing through the charge-eliminating roller 51*b* becomes substantially 0 A while the sheet S passes through the charge-elimination nip depending on the value of the charge-eliminating voltage. In this case, the fluctuation of the current value corresponding to the electrification charge amount of the sheet S may be buried in noise (signal-to-noise (S/N) ratio becomes low), and it may become difficult to perform evaluation of the electrification charge amount of the sheet S and setting of the charge-eliminating voltage according to the electrification charge amount properly. In addition, in the case in which the high voltage for detection is controlled by the constant voltage control with the same voltage value as the charge-eliminating voltage, there may be a case in which the current flowing through the charge-eliminating roller 51*b* while the sheet S passes through the charge-eliminating nip becomes very large depending on the value of the charge-eliminating voltage. In this case, by the current exceeding a detectable range of the current detecting circuit 55A, it may become difficult to perform the proper control.

Therefore, by using the constant current control for the high voltage for detection, it becomes less likely for the above-mentioned inconvenience to occur.

Image in the Detecting Mode

A sheet S for test used in the detecting mode (second mode) may be any one of a solid white sheet S on which the toner image is not transferred in the image forming apparatus 100 and a sheet S on which a test chart is transferred in the image forming apparatus 100. The solid white sheet S is a sheet which is output in a case in which the image forming apparatus 100 performs the normal image forming operation based on image data with print ratio (toner coverage ratio) of 0%. The test chart is a toner image for test (pattern image for test) which is set in advance. The test chart is output by the image forming apparatus 100 performing the normal image forming operation based on image data for the test chart, which is stored in advance in the ROM 220.

An advantage of using the solid white sheet S in the detecting mode is that it is possible to detect the electrification charge amount of the sheet S in a state in which there is only the sheet S to which the toner image is not transferred. Therefore, for example, in a case in which the image forming job, which prints an image with low print ratio, is executed after the detecting mode, it becomes possible to make the value of the charge-eliminating voltage more accurate.

An advantage of using the sheet S on which the test chart is transferred in the detecting mode is that it is possible to detect the electrification charge amount of the sheet S, which is in a state where the toner image with print ratio close to the image output under general use condition is transferred. Therefore, for example, in a case in which the image forming job, which prints a general image (e.g., an image of which content is mainly text) is executed after the detecting mode, it becomes possible to make the value of the charge-eliminating voltage more accurate.

Incidentally, regardless of whether the solid white or the test chart is used in the detecting mode, while the test sheet S passes through the secondary transfer portion T2 in the image forming apparatus 100, it is assumed that the same transfer voltage as during the normal image formation is applied to the secondary transfer roller 9. That is, in the detecting mode (second mode), the control circuit 200 detects the electrification charge amount of the sheet by using the sheet which has passed through the transfer portion of the image forming apparatus in a state in which the same bias electric field is formed as when the toner image is transferred. By this, it becomes possible to detect the electrification charge amount of the sheet S in a state of being charged in the transferring portion under the same condition as during the normal image formation, and make the value of the charge-eliminating voltage more accurate.

Summary of the Present Embodiment

As described above, in the present Embodiment, the electrification charge amount of the sheet S is detected by using the charge-eliminating roller 51*b* itself, which is the charge-eliminating member of contact type. In other words, the control circuit 200 (control unit) detects the electrification charge amount of the sheet based on the detecting result of the voltage detecting circuit 55V (detecting unit) while the sheet passes through the charge-eliminating roller 51*b* (charge-eliminating member).

Therefore, compared to a case in which, for example, a surface potential sensor of non-contact type, which is disposed separately from the charge-eliminating member, is used, it becomes possible to provide the charge-eliminating apparatus, which can detect the electrification charge amount of the sheet, and the image forming system provided with the charge-eliminating apparatus with a simpler configuration.

In the present Embodiment, since there is no need to dispose the additional surface potential sensor to detect the electrification charge amount of the sheet S, it becomes possible to reduce cost and space for disposition needed upon adding the surface potential sensor.

In addition, in the present Embodiment, by using the charge-eliminating roller 51*b* itself, which is the charge-eliminating member of contact type, the value of the charge-eliminating voltage is determined based on the detecting result of the voltage or the current when the high voltage for detection is applied thereto. In other words, the control circuit 200 (control unit) determines the value of the voltage (charge-eliminating voltage) to be applied to the charge-eliminating roller 51*b* (charge-eliminating member) by the high voltage power source 55 (voltage applying unit) in order to eliminate the charge of the sheet based on the detecting result of the voltage detecting circuit 55V (detecting unit) while the sheet passes through the charge-eliminating roller 51*b* (charge-eliminating member).

Therefore, compared to the case in which, for example, the surface potential sensor of non-contact type, which is disposed separately from the charge-eliminating member, is used, it becomes possible to provide the charge-eliminating apparatus, which can determine the value of the charge-eliminating voltage according to the electrification charge amount of the sheet, and the image forming system provided with the charge-eliminating apparatus with a simpler configuration.

In addition, in the present Embodiment, since the value of the charge-eliminating voltage is determined based on the detecting result of the voltage detecting circuit 55V (detecting unit), it becomes possible to reduce a load of adjusting work for the charge-eliminating voltage by a user. The adjusting work for the charge-eliminating voltage by the user means a work repeatedly performing a series of operations such as, for example, (1) the user causes the image forming system 400 to discharge the sheet for test, (2) the user manually measures the electrification charge amount of the discharged sheet for test using a surface potential meter, and (3) the user increases or decreases a set value for the charge-eliminating voltage by operating the user interface of the charge-eliminating apparatus 300 or of the image forming system 400 according to the measuring result, until the electrification charge amount of the sheet for test becomes sufficiently small.

Modified Examples

In the present Embodiment, the example in which the high voltage for detection is controlled by the constant current control is described, however, the high voltage for detection may be controlled by the constant voltage control. That is, it may be configured that a fluctuation amount of the value of the current while the sheet S passes through the charge-eliminating nip in a state in which a predetermined voltage set in advance is applied to the charge-eliminating roller 51*b* is used as detected current, and the electrification charge amount of the sheet S and the charge-eliminating voltage is determined based on the detected current. In this case, a table etc. indicating relationship between the detected current and the electrification charge amount of the sheet S or the charge-eliminating voltage (corresponding to part (a) and part (b) of FIG. 6) is obtained through a preliminary study and stored in the ROM 220.

In addition, the relationship between the detected voltage detected by using the charge-eliminating roller 51*b* and the electrification charge amount of the sheet S or the charge-eliminating voltage may vary depending on the material (type) and a thickness (basis weight) of the sheet S. Therefore, the calculating method of the electrification charge amount of the sheet S and the charge-eliminating voltage based on the detected voltage may be changed according to at least one of the material or the thickness of the sheet S. By this, it becomes possible to determine the electrification charge amount of the sheet S and the charge-eliminating voltage with higher accuracy. Specifically, it may be configured that conversion tables for the electrification charge amount according to the material and/or the thickness of the sheet S (a paper type table and/or a paper thickness table in FIG. 4) are stored in the ROM 220 in advance, and the CPU 201 refers to the conversion tables based on information of the sheet S included in the job information. Instead of the conversion tables, parameters (coefficients of calculation formula) which enable the conversion of the electrification charge amount according to the material and the thickness of the sheet S may be prepared. In addition, tables (the electrification charge conversion table and the charge-eliminating voltage conversion table) indicating the relationships between the detected voltage and the electrification charge amount and the charge-eliminating voltage may be prepared for each of the types and the thicknesses of the sheet S.

Embodiment 2

In the Embodiment 1, the configuration in which the control circuit 200 automatically determines the value of the charge-eliminating voltage is described. In the Embodiment 2, a configuration in which the determined result of the electrification charge amount of the sheet S is presented to a user, and the adjustment of the charge-eliminating voltage is left up to the user will be described. Hereinafter, elements with common reference numerals to the Embodiment 1 are assumed to be provided with substantially the same configuration and action as those described in the Embodiment 1 unless otherwise described, and a part which is different from the Embodiment 1 will be mainly described.

Charge-Eliminating Voltage Adjusting Switch

A charge-eliminating apparatus 300 in the present Embodiment is provided with the operating portion for charge-eliminating 54 which is capable of operation to change operating conditions for the charge-eliminating apparatus 300. In FIG. 7, an enlarged view of the operating portion for charge-eliminating 54 is shown. The operating portion for charge-eliminating 54 is an example of an input unit (setting unit) which allows a user to input (set) the value of the voltage to be applied to the charge-eliminating roller 51*b* (charge-eliminating member) by the high voltage power source 55 (voltage applying unit).

The operating portion for charge-eliminating 54 includes a changeover switch 54*a* and a voltage adjusting switch 54*b*. By operating the changeover switch 54*a*, the user can switch between output (ON) and stop outputting (OFF) of the charge-eliminating voltage by the high voltage power source 55 (FIG. 2), which applies the charge-eliminating voltage to the charge-eliminating roller 51*b*. The voltage adjusting switch 54*b* allows the user to adjust the value of the charge-eliminating voltage.

The value of the charge-eliminating voltage may be fixed at a preset value according to a category of the sheet S. For example, in a case of a plastic film or a synthetic paper, it is known that it is likely for those sheets to be dielectrically polarized more strongly in the secondary transfer portion than a plain paper and for the charge amount of the sheet S to become larger. Therefore, in a case in which the plastic film or the synthetic paper is used as the sheet S, it may be considered that the value of the charge-eliminating voltage is set in advance according to the category of the sheet S so that the charge-eliminating voltage is higher voltage (so as an absolute value thereof to be large) than a case in which the plain paper is used as the sheet S. However, even for the sheet S in the same category, there are cases in which an appropriate value of the charge-eliminating voltage fluctuates due to a difference in electric resistance caused by a difference in specific material, a difference in a thickness and a difference in use environment, etc. Therefore, in the present Embodiment, it is configured that the user can adjust the value of the charge-eliminating voltage.

The voltage adjusting switch 54*b* in the present Embodiment includes a display portion, which displays the value of the charge-eliminating voltage in two digits, and buttons (+button and − button) to increase or decrease the value of the charge-eliminating voltage. Upon pressing the + button, a number in a corresponding digit is increased, and upon pressing the − button, a number in a corresponding digit is decreased.

The value displayed in the display portion is what displays an absolute value of the charge-eliminating voltage as a two-digit number in a unit of 0.1 kV. That is, what multiplies −0.1 kV to the value displayed in the display portion of the voltage adjusting switch 54*b* is the set value for the charge-eliminating voltage. For example, in a case in which "45" is displayed in the display portion of the voltage adjusting switch 54*b*, the set value for the charge-eliminating voltage is −4.5 kV. From this state, upon pressing the − button in a tens place once and the + button in a ones place twice, the display becomes "37" and the value of the charge-elimination voltage is set to −3.7 kV.

Incidentally, in a case in which the display is set to "00" with the voltage adjusting switch 54*b*, the value of the charge-eliminating voltage is set to 0 V (0.0 kV). In this case, a state of the high voltage power source 55 becomes the same state as when the changeover switch 54*a* is turned off. This state may also be referred to as a state in which the high voltage power source 55 applies 0 V to the charge-eliminating roller 51*b*.

Incidentally, a display type and an input type of the value of the charge-eliminating voltage is not limited to those described above. Instead of displaying upper two digits of the value of the charge-eliminating voltage, the value of the charge-eliminating voltage itself may be displayed, or a numerical value which represents a level of the charge-eliminating voltage, for example, in 10 levels may be displayed. The value of the charge-eliminating voltage may be displayed, for example, on a screen of the user operating portion 102 or of an external computer communicably connected to the image forming system 400. As the input type of the value of the charge-eliminating voltage, a numeric keypad for numerical input may be provided to the operating portion for charge-eliminating 54, or by a touch panel operation of the user operating portion 102, or it may be configured to receive an input via the external computer. The user operating portion 102 is another example of the input unit (setting unit) which allows the user to input (set) the value of the voltage to be applied to the charge-eliminating roller 51*b* (charge-eliminating member) by the high voltage power source 55 (voltage applying unit).

The configuration of the image forming system 400 and the charge-eliminating apparatus 300 in the present Embodiment is the same as in the Embodiment 1. That is, in the present Embodiment, by operating the user operating portion 102, the user can instruct the control circuit 200 to execute the adjusting mode as an independent operation of the image forming job. However, instead of automatically determining the value of the charge-eliminating voltage after determining the electrification charge amount of the sheet S, in the present Embodiment, it is configured to display the obtained electrification charge amount of the sheet S on a screen of the user operating portion 102 and request the user to input the value of the charge-eliminating voltage.

Control Flow

A control procedure performed by the control circuit 200 in the present Embodiment will be described according to a flowchart in FIG. 8. Since processes from S10 to S15 are the same as in the Embodiment 1, description thereof will be omitted. After determining the electrification charge amount of the sheet S in S15, the CPU 201 displays the electrification charge amount on the screen of the user operating portion 102 (S16') and waits for an input from a user. In FIG. 9, an example of a screen display in S16' is illustrated. On a display 102*a* as the display portion of the user operating portion 102, information 102*b*, which represents the electrification charge amount of the sheet S, and information 102*c*, which prompts the user to input the value of the charge-eliminating voltage, are displayed. The user operates the operating portion for charge-eliminating 54 based on the screen display and inputs the value of the charge-eliminating voltage according to the electrification charge amount (S17). The CPU 201 stores the value input from the user as a new value of the charge-eliminating voltage in the RAM 210 (S18) and ends the adjusting mode.

Incidentally, the display 102*a* of the user operating portion 102 is an example of a display unit which displays information to the user and it may be configured that, for example, information equivalent to the screen display in FIG. 9 is displayed on an external computer communicably connected to the control circuit 200. The external computer may be a smartphone or a tablet of the user.

In addition, the information displayed on the screen in S16' is not limited to the numerical value of the electrification charge amount of the sheet S itself, but may be other information related to the electrification charge amount of the sheet S. For example, since the electrification charge amount (surface electric charge density) of the sheet S is proportional to the surface potential of the sheet S, the value displayed on the screen in S16' may be the surface potential of the sheet S.

Summary of the Present Embodiment

As described above, in the present Embodiment, the electrification charge amount of the sheet S is detected by using the charge-eliminating roller 51*b* itself, which is the charge-eliminating member of contact type. In other words, the control circuit 200 (control unit) detects the electrification charge amount of the sheet based on the detecting result of the voltage detecting circuit 55V (detecting unit) while the sheet passes through the charge-eliminating roller 51*b* (charge-eliminating member). Therefore, as in the Embodiment 1, compared to the case in which, for example, the surface potential sensor of non-contact type, which is disposed separately from the charge-eliminating member is used, it becomes possible to provide the charge-eliminating apparatus, which can detect the electrification charge amount of the sheet, and the image forming system provided with the charge-eliminating apparatus with a simpler configuration.

In addition, in the present Embodiment, the electrification charge amount detected by using the charge-eliminating roller 51*b* is displayed on the display 102*a* of the user operating portion 102. That is, the charge-eliminating apparatus 300 is further provided with the display 102*a* (display unit) which displays information. In the detecting mode (second mode), the control circuit 200 (control unit) displays information on the electrification charge amount of the sheet which is detected based on the detecting result of the voltage detecting circuit 55V (detecting unit) on the display 102*a*.

By this, it becomes possible to inform the user of the charged state of the sheet S without using the surface potential sensor. In addition, by configuring to allow the user to input the value of the charge-eliminating voltage via the operating portion for charge-eliminating 54 (input unit) based on the screen display, it becomes possible to reduce the load of the adjusting work of the user compared to the case in which the user manually measures the electrification charge amount using the surface potential meter.

Modified Examples

In the present Embodiment, what is detected in the adjusting mode is the electrification charge amount of the sheet S before the charge-eliminating by the charge-eliminating roller 51*b*, however, it may be configured to detect the electrification charge amount of the sheet S after the charge-eliminating by the charge-eliminating roller 51*b*. For example, the charge-eliminating apparatus 300 may be provided with a circulation conveyance path to convey the sheet S, which has passed through the charge-eliminating nip, toward the charge-eliminating nip again. While the sheet S passes through the charge-eliminating nip for the first time, the charge-eliminating voltage is applied to the charge-eliminating roller 51*b* to perform the charge-eliminating of the sheet S, and while the sheet S passes through the charge-eliminating nip for the second time, the detected voltage is obtained by applying the high voltage for detection to the charge-eliminating roller 51*b*. In this configuration, information S102*b* displayed on the screen in the S16' is the electrification charge amount of the sheet S after the charge-eliminating by the charge-eliminating roller 51*b*. In addition, the processes from S13 to S18 may be repeated automatically (or based on an instruction from the user) until the electrification charge amount of the sheet S after the charge-eliminating becomes a sufficiently low value.

Other Embodiments

In each of the Embodiments described above, the charge-eliminating apparatus 300, which performs charge-eliminating of the sheet S, is described, however, the charge-eliminating apparatus 300 has a function as a charge adjusting apparatus, which adjusts the charged state of the sheet S by supplying an electric charge to the sheet S via the charge-eliminating roller 51*b* as a charge supplying member. The charge adjusting apparatus may be what does not necessarily reduce (not eliminate) the electrification charge amount of the sheet S. For example, in a state in which the sheets S are stacked after processing by the charge adjusting apparatus, the charge adjusting apparatus may be what adjusts the electrification charge amount of each surface of the sheet S so that the surfaces of overlapping sheets, which are opposing to each other, are in a state being charged to the same polarity. Specifically, the charge adjusting apparatus applies voltage to every other sheet of a plurality of the sheets so that the electrostatic polarities of the sheet surfaces are reversed. In this case, by the surfaces of the overlapping sheets, which are opposing to each other, being charged to the same polarity, it becomes possible to reduce sticking between the sheets due to electrostatic force. In addition, by applying the control described in each Embodiment to control of the voltage to be applied to the charge-eliminating roller 51*b* as the charge supplying member, it become possible to adjust the charged state of the sheet S more properly.

In addition, in each of the Embodiments described above, the charge-eliminating roller 51*b*, which is a roller member, is described as an example of the charge-eliminating member of contact type, which contacts the sheet S. However, the charge-eliminating member of contact type is not limited thereto, but may be, for example, a brush member of which electroconductive fibers or an elongated electroconductive sheet pieces contact the sheet S.

In addition, in each of the Embodiments described above, it is described as the charge of the sheet S is mainly occurred in the transfer portion of the electrophotographic process. Not limited to this, however, in an image forming system other than the electrophotographic type, such as an inkjet type, the charge of the sheet S may be occurred by triboelectric charging or peeling charging due to rubbing against and/or peeling off of a conveyance guide, a conveyance roller and/or a conveyance belt, etc. Therefore, the present technique may be applied to an image forming system of a type other than the electrophotographic type.

In addition, in the Embodiments 1 and 2, the determination of the value of the charge-eliminating voltage and the screen display of the electrification charge amount are described as examples of control according to the electrification charge amount of the sheet S. Not limited to these, however, the electrification charge amount of the sheet S detected by using the charge-eliminating roller 51*b* (or an amount, which correlates with the electrification charge amount of the sheet S, such as the detected voltage) may be used for other control. For example, in a case in which the electrification charge amount of the sheet S exceeds a predetermined threshold value, a warning may be displayed to a user.

Other Embodiments

The present disclosure may also be realized by a process in which a program realizing one or more functions of the Embodiments described above is supplied to the system or the apparatus via a network or a storage medium, and one or more processors in a computer of the system or the apparatus read out and execute the program. In addition, the present invention may also be realized by a circuit which realizes one or more functions (e.g., ASIC).

According to the present disclosure, it becomes possible to provide a charge-eliminating apparatus, an image forming system and a charge adjusting apparatus which can detect the electrification charge amount of the sheet or control according to the electrification charge amount of the sheet with a simpler configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-212351 filed on Dec. 15, 2023, which is hereby incorporated by reference herein in its entirety.

What is claimed is:

1. An image forming system comprising:

a transfer portion configured to transfer a toner image to a sheet;

a fixing portion configured to fix the toner image transferred by the transfer portion;

a charge supplying member configured to supply charge to the sheet while the charge supplying member is nipping and conveying the sheet, the supplying member being disposed downstream of the fixing portion in a sheet conveyance direction;

a voltage applying unit configured to apply a voltage to the charge supplying member;

a detecting unit configured to detect a voltage applied to the charge supplying member or a current flowing through the charge supplying member;

a controller configured to measure an electrification charge amount of the sheet based on a detecting result of the detecting unit while the charge supplying member is nipping and conveying the sheet; and a display configured to display information on the electrification charge amount of the sheet that is measured and detected based on the detecting result of the detecting unit.

2. The image forming system according to claim 1, wherein the controller is capable of performing an operation in a first mode in which the voltage applying unit applies the voltage to the charge supplying member in order to adjust the charge state of the sheet on which an image has been formed in an image forming job and in a second mode performed independently from the image forming job and the electrification charge amount of the sheet is measured based on the detecting result of the detecting unit.

3. The image forming system according to claim 2, wherein the detecting unit detects the voltage applied to the charge supplying member upon application of a voltage under constant current control, and wherein the controller measures the electrification charge amount of the sheet based on the voltage detected by the detecting unit while the charge supplying member is nipping and conveying in the second mode.

4. The image forming system according to claim 3, wherein the controller includes a memory portion configured to store information indicating a corresponding relation between a voltage and an electrification charge amount of the sheet, and measures the electrification charge amount of the sheet based on a fluctuation amount of the voltage detected by the detecting unit and the information of the memory portion.

5. The image forming system according to claim 3, wherein the controller measures the electrification charge amount of the sheet on which a toner image is not transferred in the transfer portion of in the second mode.

6. The image forming system according to claim 3, wherein the controller measures the electrification charge amount of the sheet on which a toner image for test is transferred in the transfer portion in the second mode.

7. The image forming system according to claim 3, wherein the controller measures the electrification charge amount of the sheet that has passed through the transfer portion in a state in which the same bias electric field is formed as when a toner image is transferred in the second mode.

8. The image forming system according to claim 1, further comprising an operating portion which allows a user to input a value, value of the voltage applied to the charge supplying member by the voltage applying unit.

9. The image forming system according to claim 1, wherein a relation of the electrification charge amount of the sheet to the detecting result of the detecting unit is changed according to at least one of a thickness of the sheet and a material of the sheet.

10. The image forming system according to claim 1, wherein the charge supplying member is a roller pair constituted by a roller member to which the voltage is applied by the voltage applying unit and an opposing roller electrically grounded and configured to nip and convey the sheet with the roller member.

11. A charge adjusting apparatus comprising:

a charge supplying member configured to supply charge to a sheet while the charge supplying member is nipping and conveying the sheet, the supplying member being disposed downstream of a fixing portion in a sheet conveyance direction for fixing a toner image that is transferred onto the sheet;

a voltage applying unit configured to apply a voltage to the charge supplying member;

a detecting unit configured to detect a voltage applied to the charge supplying member upon application of a voltage under constant current control; and a controller configured to be capable of performing an operation in a first mode in which the voltage applying unit applies the voltage to the charge supplying member in order to adjust the charge state of the sheet on which an image has been formed in an image forming job and in a second mode performed independently from the image forming job and in which the value of the voltage to be applied to the charge supplying member by the voltage applying unit in the first mode is determined based on the detecting result of the detecting unit while the charge supplying member is nipping and conveying the sheet.

12. The charge adjusting apparatus according to claim 11, wherein the controller includes a memory portion configured to store information indicating a corresponding relation between a fluctuation amount of the voltage detected by the detecting unit in the second mode and the value of the voltage to be applied to the charge adjusting member in the first mode.

13. The charge adjusting apparatus according to claim 11, wherein the charge supplying member is a roller pair constituted by a roller member to which the voltage is applied by the voltage applying unit and an opposing roller electrically grounded and configured to nip and convey the sheet with the roller member.

14. An image forming system comprising:

an image forming apparatus configured to form an image on a sheet; and a charge adjusting apparatus according to claim 11, wherein the charge adjusting apparatus adjusts the charge state of the sheet on which the image is formed by the image forming apparatus.

15. The charge adjusting apparatus according to claim 11, wherein the controller determines the value of the voltage to be applied to the charge supplying member by the voltage applying unit in the first mode based on the detecting result of the detecting unit when the charge supplying member nips and conveys the sheet to which the voltage is applied in the transfer portion in the second mode.

16. The charge adjusting apparatus according to claim 15, wherein the controller determines the value of the voltage to be applied to the charge supplying member by the voltage applying unit in the first mode based on the detecting result of the detecting unit when the charge supplying member nips and conveys the sheet on which the toner image is transferred in the transfer portion in the second mode.

17. The charge adjusting apparatus according to claim 15, wherein the controller determines the value of the voltage to be applied to the charge supplying member by the voltage applying unit in the first mode based on the detecting result of the detecting unit when the charge supplying member nips and conveys the sheet on which a toner image for test is transferred in the transfer portion in the second mode.

18. The charge adjusting apparatus according to claim 15, wherein the controller determines the value of the voltage to be applied to the charged supplying member by the voltage applying unit in the first mode based on the detecting result of the detecting unit when the charge supplying member nips and conveys the sheet which has passed through the transfer portion in a state in which the same bias electric field as that used for transferring a toner image is formed in the second mode.

19. The charge adjusting apparatus according to claim 11, wherein the operation in the second mode is performed based on being instructed by a user via an operation portion.

20. The charge adjusting apparatus according to claim 11, wherein the charge supplying member is configured to eliminate charge from the sheet while the charge supplying member is nipping and conveying the sheet.

21. An image forming system comprising:

a transfer portion configured to transfer a toner image to a sheet;

a fixing portion configured to fix the toner image transferred by the transfer portion;

a charge supplying member configured to supply charge to a sheet while the charge supplying member is nipping and conveying the sheet, the supplying member being disposed downstream of the fixing portion in a sheet conveyance direction;

a voltage applying unit configured to apply a voltage to the charge supplying member;

a detecting unit configured to detect a voltage applied to the charge supplying member upon application of a voltage under constant current control; and a controller configured to be capable of performing an operation in a first mode in which the voltage applying unit applies the voltage to the charge supplying member in order to adjust the charge state of the sheet on which an image has been formed in an image forming job and in a second mode performed independently from the image forming job and the value of the voltage to be applied to the charge supplying member by the voltage applying unit in the first mode is determined based on the detecting result of the detecting unit while the charge supplying member is nipping and conveying the sheet.

22. A charge adjusting apparatus comprising:

a charge supplying member configured to supply charge to a sheet while the charge supplying member is nipping and conveying the sheet, the supplying member being disposed downstream of a fixing portion in a sheet conveyance direction for fixing a toner image, which is transferred, onto a sheet;

a voltage applying unit configured to apply a voltage to the charge supplying member;

a detecting unit configured to detect a current flowing through the charge supplying member upon application of a voltage under constant current control; and a controller configured to be capable of performing an operation in a first mode in which the voltage applying unit applies the voltage to the charge supplying member in order to adjust the charge state of the sheet on which an image has been formed in an image forming job and in a second mode performed independently from the image forming job and the value of the voltage to be applied to the charge supplying member by the voltage applying unit in the first mode is determined based on the detecting result of the detecting unit while the charge supplying member is nipping and conveying the sheet.

23. The charge adjusting apparatus according to claim 22, wherein the controller includes a memory portion configured to store information indicating a corresponding relation between a fluctuation amount of the flowing current detected by the detecting unit in the second mode and the value of the voltage to be applied to the charge adjusting member in the first mode.

24. The charge adjusting apparatus according to claim 22, wherein the charge supplying member is a roller pair constituted by a roller member to which the voltage is applied by the voltage applying unit and an opposing roller electrically grounded and configured to nip and convey the sheet with the roller member.

25. The charge adjusting apparatus according to claim 22, wherein the controller determines the value of the voltage to be applied to the charge supplying member by the voltage applying unit in the first mode based on the detecting result of the detecting unit when the charge supplying member nips and conveys the sheet to which the voltage is applied in the transfer portion in the second mode.

26. The charge adjusting apparatus according to claim 22, wherein the operation in the second mode is performed based on being instructed by a user via an operation portion.

27. An image forming system comprising:

a transfer portion configured to transfer a toner image to a sheet;

a fixing portion configured to fix the toner image transferred by the transfer portion;

a charge supplying member configured to supply charge to a sheet while the charge supplying member is nipping and conveying the sheet, the supplying member being disposed downstream of the fixing portion in a sheet conveyance direction;

a voltage applying unit configured to apply a voltage to the charge supplying member;

a detecting unit configured to detect a current flowing through the charge supplying member upon application of a voltage under constant current control; and a controller configured to be capable of performing an operation in a first mode in which the voltage applying unit applies the voltage to the charge supplying member in order to adjust the charge state of the sheet on which an image has been formed in an image forming job and in a second mode performed independently from the image forming job and the value of the voltage to be applied to the charge supplying member by the voltage applying unit in the first mode is determined based on the detecting result of the detecting unit while the charge supplying member is nipping and conveying the sheet.

28. The image forming system according to claim 2, wherein the detecting unit detects the current flowing through the charge supplying member upon application of a voltage under constant current control, and wherein the controller measures the electrification charge amount of the sheet based on the current flowing through detected by the detecting unit while the charge supplying member is nipping and conveying the sheet in the second mode.

29. The image forming system according to claim 2, wherein the controller measures the electrification charge amount of the sheet to which the voltage is applied in the transfer portion in the second mode.

* * * * *